INVENTOR.
Otto J. M. Smith

Sept. 15, 1970  O. J. M. SMITH  3,529,174
POWER SYSTEM WITH TRANSIENT CONTROL AND METHOD
Filed Aug. 8, 1966  7 Sheets-Sheet 3

INVENTOR.
Otto J. M. Smith
BY
Attorneys

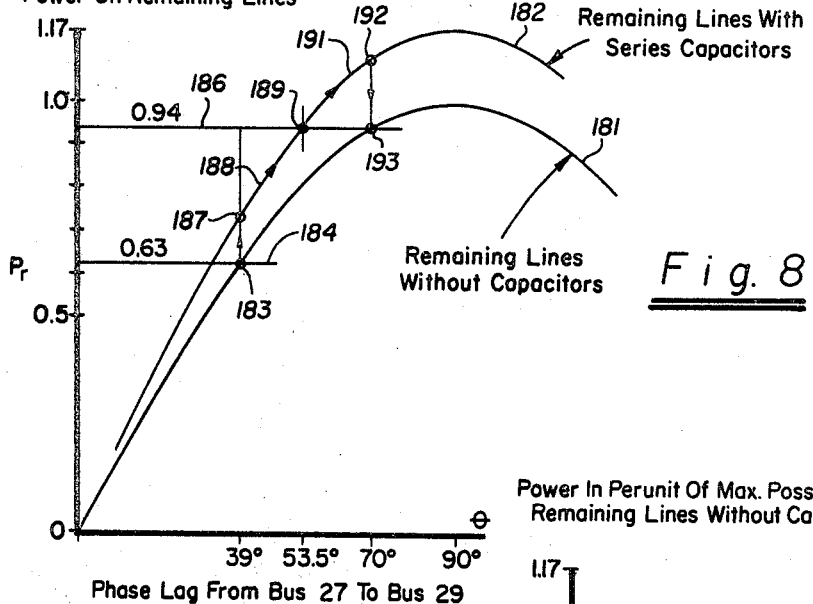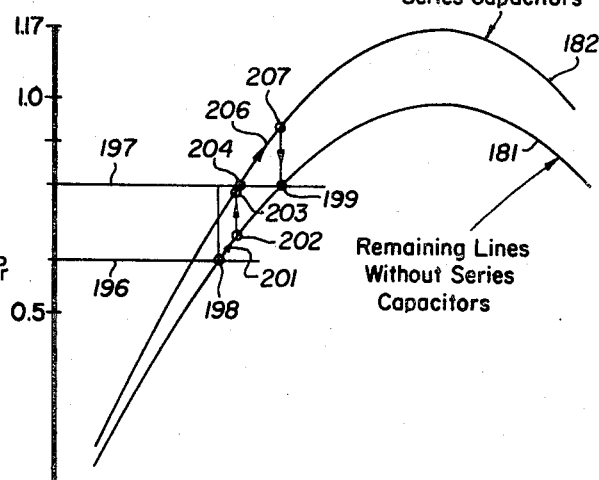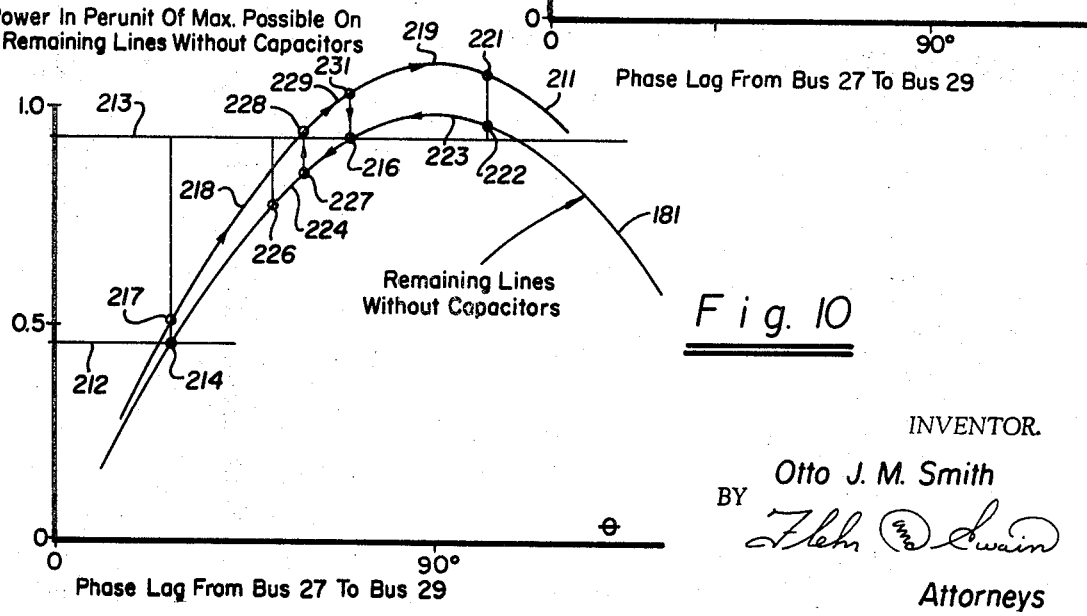

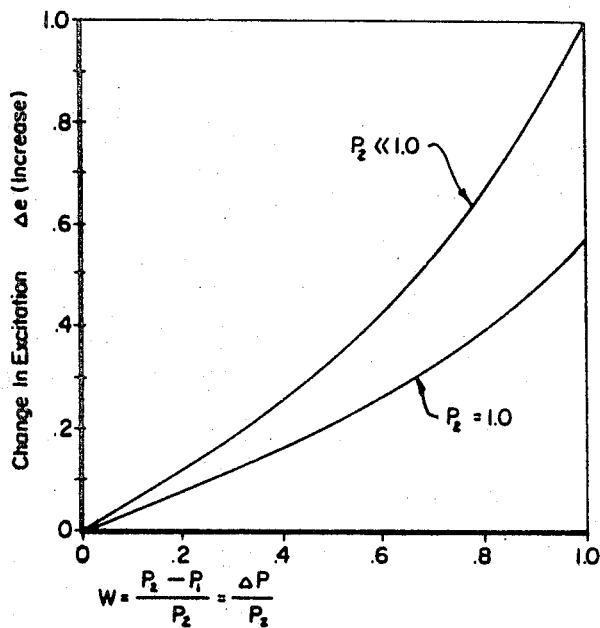
Fig. 13
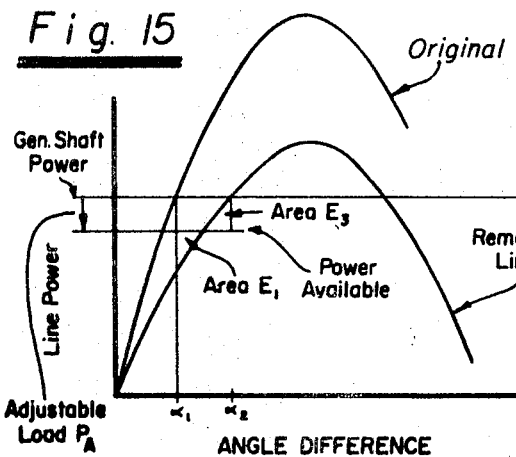
Fig. 15
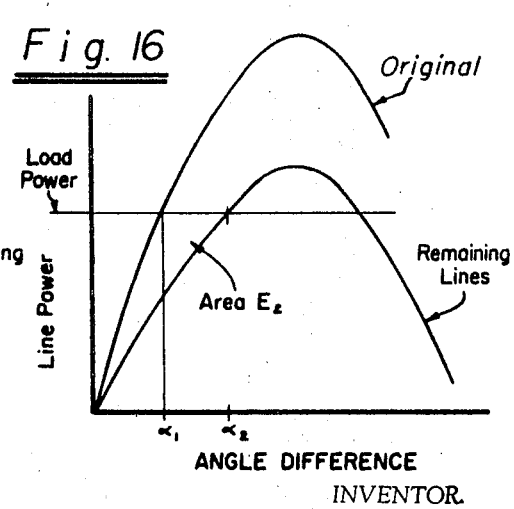
Fig. 16
INVENTOR.
Otto J. M. Smith
BY
Attorneys

United States Patent Office 3,529,174
Patented Sept. 15, 1970

3,529,174
POWER SYSTEM WITH TRANSIENT
CONTROL AND METHOD
Otto J. M. Smith, 612 Euclid Ave.,
Berkeley, Calif. 94708
Filed Aug. 8, 1966, Ser. No. 570,805
Int. Cl. H02j 1/10
U.S. Cl. 307—43
94 Claims

ABSTRACT OF THE DISCLOSURE

Transient control system and method for a power transmission system consisting of a series capacitor normally short-circuited, which is first inserted into the transmission line at the start of the transient to increase the line admittance, and which is first removed when the line phase angular velocity deviation is zero, and which may be inserted a second time if the line phase angular velocity deviation exceeds a preselected fraction of the previous maximum deviation, and removed a second time when the velocity deviation again is zero. Control can also be effected by switched shunt reactors or capacitors, and by switched machine field voltages.

---

This invention relates to a power system with transient control and method.

The growth of large interconnected power systems and particularly the use of "grids" and long transmission lines has made the problem of transient stability of power systems acute. Present practice uses circuit breakers to remove transmission lines that have been "fauited" by a short circuit or lightning stroke. The resulting transient due to the removal or the addition of a transmission line may cause oscillations of the phase angle of the generated voltage in the various generators, and one or more of these generators may not return to a stable steady state operating condition. It is not uncommon for a generator to overspeed and lose synchronism, thereby requiring its removal from the power system. It is well known in the art that the transfer function of the voltage regulator has an influence on the degree of stability of a generator connected to a power system. Design for stability at present consists of adjusting the transfer functions of the voltage regulators of the generators and designing the system with low impedances in the transmission lines. To obtain low transmission line impedances, series capacitors are often inserted. These are quite expensive and, therefore, the design for stability involves economic considerations of the cost of low reactance transmission lines. There is, therefore, a need for a new and improvd power system with transient control and a method for obtaining such transient control.

In general, it is an object of the present invention to provide a power system with transient control and a method for achieving transient control which overcomes the above named disadvantages.

Another object of the invention is to provide a system and method of the above character in which it is possible to obtain direct control of the transients in the power system.

Another object of the invention is to provide a system and method of the above character which prevents the oscillation of the rotors of synchronous generators from becoming cumulative.

Another object of the invention is to provide a system and method of the above character which will prevent synchronous generators from falling out of synchronism.

Another object of the invention is to provide a system and method of the above character in which it is possible to control the change of the phase angle of the synchronous generator when it is changing from some initial value to a final desired value so that it will approach its final value tangentially and will not overshoot.

Another object of the invention is to provide a system and method of the above character in which it is possible to control the phase angle difference between the sending and receiving end of a long transmission line used in a power system so that if a phase angle should change it will approach its final steady state value tangentially and will not overshoot.

Another object of the invention is to provide a system and method of the above character which is particularly useful for interconnected systems and particularly such systems which are dynamic.

Another object of the invention is to provide a system and method of the above character which is applicable to hydraulic, mechanical, pneumatic, transportation, electronic and electrical systems.

Additional objects and features of the invention will appear from the following description in which the preferred embodiments are set forth in detail in conjunction with the accompanying drawings.

Referring to the drawings:

FIG. 8 is a graphical plot of the power flow versus the phase angle shift for one operating condition of the system shown in FIG. 7.

FIGS. 9 and 10 are graphs similar to the graph in FIG. 8 but for different operating conditions of the system shown in FIG. 7.

FIG. 13 is a graph showing a plot of mathematical operation performed in the computer of FIG. 11 in the process of controlling the excitation of the synchronous generator.

FIGS. 15 and 16 are graphs for the system shown in FIG. 14.

In general, the power system with transient control consists of a source of power and a power-absorbing load. A network of transmission lines is connected between the source of power and the power-absorbing load. The source of power is capable of storing energy dynamically. The same is true of the power-absorbing load which can also store energy dynamically. A control is provided for the energy-transferring characteristic of the transmission lines or of a coupling. The control includes means for sensing or detecting the initiation of a transient. Upon sensing this change of state, the control includes means for controlling the parameters in the system as a function of the charge of state whereby the control produces a smooth non-oscillatory change from the state immediately following the fault to the final steady state new distribution of power from the components of the system.

Figures 1, 2:
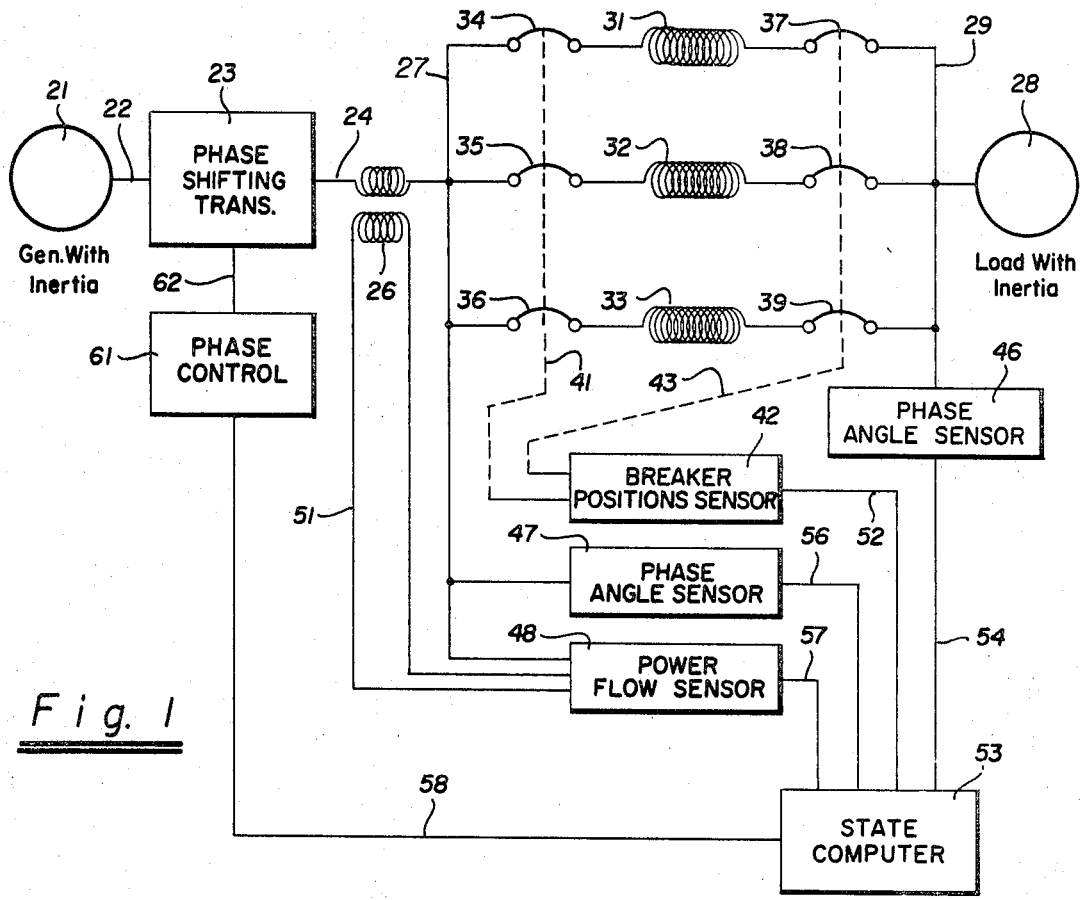
FIG. 1 is a block diagram illustrating a generator connected to a load by a phase-shifting transformer and three transmission lines with a control which is capable of changing the phase of the phase-shifting transformer.
FIG. 2 is a graph which shows the power versus phase angle shift characteristic of the system in FIG. 1 for two different values of the phase shift in the phase shift transformer.

More in particular, the power system shown in the block diagram in FIG. 1 consists of a generator 21 with inertia which is driven mechanically by a prime mover (not shown). An electrical connection 22 in the form of a three-phase alternating current circuit connects the generator 21 to a three-phase phase-shifting transformer bank 23. The secondary windings on this transformer bank are connected through switches which are not shown to a three-phase alternating current circuit 24. The power flows from circuit 24 through the primary of current transformers 26 to a three-phase bus 27. A load 28 with inertia is supplied from a second three-phase bus 29. Three parallel transmission lines 31, 32 and 33 interconnect the buses 27 and 29 through circuit breakers 34–39. Although three transmission lines are shown in FIG. 1, this invention is applicable to power systems with one or more transmission lines.

The open or closed states of circuit breakers 34–36 are transmitted on the multiple communication channel 41 to the breaker positions sensor 42 which collects and processes this information. The open or closed states of circuit breakers 37–39 are collected and transmitted on the multiple communication channel 43 which also delivers its information to the breaker positions sensor 42. Bus 29 is connected to phase angle sensor 46 which measures the phase angle of the voltage on bus 29 with respect to a precision clock or with respect to a voltage of the same frequency somewhere else in the system. Bus 27 is connected to a phase angle sensor 47 so that the phase angle sensor 47 can measure the phase angle of the voltage on bus 27 with respect to a precision clock or with respect to the phase of another voltage of the same frequency somewhere else in the system. Bus 27 is also connected to the input of a power flow sensor 48. The secondaries of current transformers 26 are connected through circuits 51 to the input of the power flow sensor 48. The power flow sensor 48, therefore, measures the power flow from the phase-shifting transformers on circuit 24 to bus 27.

The information from breaker positions sensor 42 is transmitted on circuit 52 to a state computer 53. The information from the phase angle sensor 46 is transmitted on a circuit 54 to the state computer 53. The information from phase angle sensor 47 is transmitted on circuit 56 to the state computer 53. The information from the power flow sensor 48 is transmitted on circuit 57 to the input of the state computer 53. The output of state computer 53 is supplied to circuit 58 as a multi-dimensional vector whose components are all of the present measurements, and all of the measurements prior to the inception of a transient or a fault. Circuit 58 takes the state vector from the state computer 53 and delivers it to a phase control 61. A state vector can be defined as a plurality of N numbers assembled in a matrix of N rows by one column. The numbers represent time variable physical quantities such as shaft angle, velocity and acceleration, voltage phase and magnitude, frequency and time derivatives of frequency, power and var flows and their time derivatives and integrals, etc. The output of phase control 61 is supplied to a command circuit 62 which energizes or de-energizers the controls for the phase-shifting transformer 23.

The mode of operation of the system in FIG. 1 during the steady state is a steady flow of power from the prime mover to the shaft of generator 21. Generator 21 generates a constant power which flows on circuit 22 through the normal connection of the phase-shifting transformer 23 through circuit 24 and current transformers 26 to bus 27. The power flow then divides between the several transmission lines 31–33 approximately inversely proportional to the reactances of the lines, and then all the power is collected on bus 29 and delivered to load 28. In the steady state, the angle of the voltage on bus 27 leads in phase the angle of the voltage on bus 29. This phase angle is constant, is proportional to the power flow, and fulfills the following equation:

$$P = \frac{EV}{X}(\sin\theta) \qquad (1)$$

where:

E is the magnitude of the voltage on bus 27,
V is the magnitude of the voltage on bus 29,
X is the parallel combination of the reactances of all the transmission lines connected between bus 27 and bus 29,
$\theta$ is the phase angle between the voltage on bus 27 and the voltage on bus 29, and
P is the total power flow over the transmission lines.

This equation states that the total power flow is equal to the product of the sending end and the receiving and voltage divided by the reactance between the two ends times the sine of the phase angle difference. It can be seen from this equation that when the phase angle is 90° that the power flow is maximum.

If a fault should occur on the transmission line 31, under normal operating conditions breakers 34 and 37 would open and isolate the line. Under some conditions these breakers might reclose automatically. In the event that the breakers either did not reclose automatically or did reclose automatically and the fault did not clear so that the breakers again had to open and remain open, then all of the power flow would have to pass through transmission lines 32 and 33. The reactance in Equation 1 will have increased and, therefore the sine of $\theta$ must also increase in proportional amount.

The new steady state condition after a transient is for all of the power to flow through the remaining lines. Using $X_r$ as the reactance of the remaining lines following a transient, it can be seen that the maximum possible power which could flow stably in the steady state through the remaining lines is $$P_m = \frac{EV}{X_r} \qquad (2)$$

This maximum possible power must be more than the power flow prior to the fault in order for the system to continue without changes in the load or the generator.

This invention controls the transient between the instant of the circuit breakers 34 and 37 opening and the establishment of the new steady state flow through lines 32 and 33. The state computer 53 and the phase control 61 in combination issue a command on circuit 62 to the phase-shifting transformer 23 which advances the phase of the bus 27 with respect to generator 21 for a portion of the transient, and when the state computer 53 determines that the system state is equal to a preselected state based upon the known power flow prior the fault, then the phase control 61 issues a second command on circuit 62 to the phase-shifting transformers 23 to restore the previous phase relationship between bus 27 and generator 21. This restoration is chosen so that following the switching of the transformer there is no further change in phases of the voltages within the system and there is no further oscillation of the angle of the inertia of generator 21 or the angle of the inertia of load 28.

This mode of operation of FIG. 1 can be explained in more detail with reference to FIG. 2. In FIG. 2, the abscissa of $\theta$ is the phase lag between bus 27 and bus 29. The ordinate is $$P_r = \frac{P}{P_m} \qquad (3)$$

which is the power flow across the remaining lines as a proportion of the maximum possible power on the remaining lines. The curve 66 in FIG. 2 which has a sinusoidal shape shows the relationship between per unit power and phase angle across the remaining lines only. This power flow relationship changes to the curve 67 which also has a sinusoidal shape when the phase shifting transformer 23 is connected in the circuit. Curve 67 in FIG. 2 is for the special case when phase-shifting transformer 23 has advanced the phase of bus 27 with respect to generator 21 by an increment of 30°. In FIG. 2, the horizontal line at height $P_2$ is the total power flowing from generator to load. The horizontal line at the height $P_1$ is that portion of the power which was flowing through the remaining lines 32 and 33 prior to the fault. Point 68 on curve 66 gives the state of the power system with phase angle A prior to the fault. Point 69 on curve 66 with power flow $P_2$ and phase angle B gives the state of the system following the removal of all transients.

The computer 53 and phase control 61 in FIG. 1 cause the following sequence of events in FIG. 2. At the instant of initiation of the transient, the remaining lines are at the state represented by point 68 and are delivering power $P_1$. The generator is receiving mechanical power $P_2$ and the load is delivering mechanical power $P_2$. The vertical distance between $P_2$ and $P_1$ is therefore, the power flow differential that is not passing through the transmission lines, but should be. During the transient, this power flow differential is accelerating the inertia of the generator and decelerating the inertia of the load. The phase angle is, therefore, increasing at a time rate proportional to this power difference. The trajectory of the system state is the line 71 which leads from point 68 to point 72. At the state represented by the point 72, the phase shift transformer 23 inserts a 30° phase lead in the transmission system causing the state to rise vertically to the state represented by point 73 on curve 67. The transmission lines are now delivering more power than is being provided mechanically to the generator, the difference being the vertical height of point 73 above the level $P_2$. The transmission lines are then abstracting energy from the generator inertia and delivering energy to the load inertia. At state 73, the generator inertia is moving too fast and the load inertia is moving too slow and the generator inertia is being slowed down and the load inertia is being speeded up. The result of these changes is that the system state follows trajectory represented by line 74 from point 73 to a point 76. It reaches point 76 with the generator inertia running at its correct speed and correct phase and the load inertia running at its correct speed and correct phase with a phase between the generator and the load equal to B+30° and the phase between the bus 27 and bus 29 being B°. B° is the maximum phase difference to which the system would swing if the phase-shifting tarnsformer 23 was left in the system and it was operating on the characteristic curve 67. At the state represented by point 76, the state computer 53 delivers to phase control 61 the information that the phase shift from bus 27 to bus 29 is the correct value for the steady state operation at power $P_2$ and, therefore, the phase control 61 delivers on circuit 62 a command to phase-shifting transformer 23 which removes the phase shift from the system and restores the system operation to curve 66 in FIG. 2 dropping the state instantly from point 76 to point 69 which is the desired steady state operating point.

In FIG. 2, the area marked 1 which lies below the horizontal line $P_2$ and above the line 71 between point 68 and point 72 represents the energy stored in the inertia of generator 21 which has been taken out of the stored energy of the inertia of the load 28. This energy difference was achieved by not transmitting all of the power across the transmission lines. At the state represented by point 72, the inertia of generator 21 is moving at an excessive speed due to the energy of area marked 1. The area marked 2 in FIG. 2 above the horizontal line $P_2$ and below the line 74 between points 73 and 76 represents the extra energy taken out of the inertia of generator 21 and delivered to the inertia of load 28. When the area 2 equals the area 1, the inertia of generator 21 will have been returned to its correct speed, for generators which have no amortisseur windings.

It is common practice today to provide generators with a squirrel cage winding mounted across the face of the poles which acts as an amortisseur winding to absorb and dissipate energy when the flux field is changing or when the angle of the poles with respect to the alternating current windings is changing. It is also common practice to provide similar amortisseur windings in synchronous condensers and synchronous motors. Because of this winding, if energy is delivered to a generator inertia to increase the speed and then subsequently removed from the inertia to bring the shaft back to its previous speed, the amount which must be removed to restore the initial state is less than the amount which was stored. Applied to FIG. 2, losses during the transient therefore, require that area 2 plus the transient losses converted to area must equal area 1 in order that the state represented by point 69 be reached at the maximum of the phase angle swing of the mechanical component. It can be seen that there is a unique relationship between the power in the remaining lines prior to the fault $P_1$, the total power $P_2$, the state represented by point 72 and the transformer phase shift of 30°. This unique relationship is that which guarantees that the area 2 plus losses converted to area equals the area 1. This is commonly known in the art as the "equal area criterion."

Figure 3:
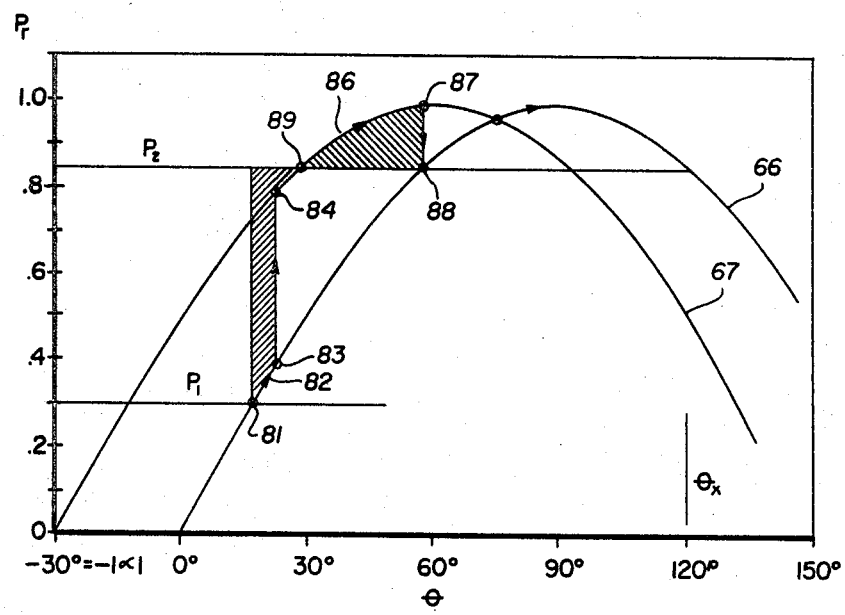
FIG. 3 is a graph which shows the power versus the phase angle shift from the generator bus to a load bus for the system in FIG. 1 for a different power flow condition.

In general, it would be too expensive to provide more than one amount of phase shift in the phase-shifting transformer, and, therefore, for a fixed phase shift of the phase-shifting transformer, the controls must provide another degree of freedom to handle all possible power variations. FIG. 3 has the same coordinates as FIG. 2. The abscissa is the phase angle between bus 27 and bus 29. The ordinate is the power flow on the remaining lines as a proportion of the maximum possible power on the remaining lines. Curve 66 shows the steady state power angle characteristic. Curve 67 shows the power angle characteristic when the phase-shifting transformer 24 has inserted a phase lead of 30°. The horizontal line $P_1$ shows the level of the initial power flow through the remaining lines. The horizontal line $P_2$ shows the level of the total power flow which eventually must be established through the remaining lines.

The mode of control in FIG. 3 is as follows. The initial state on the remaining lines both prior to and following the removal of line 31 is given by the point 81 which shows the power flow and the phase shift between bus 27 and bus 29. Prior to the fault, the remaining lines 32 and 33 were operating at a state represented by point 81 with power flow $P_1$. After the fault, the power flow remains at $P_1$ but the power flow into the shaft of the generator is the level of the line $P_2$. The difference between these is the power being stored and accelerating the inertia of the generator 21. The trajectory of the state of the system is shown by line 82 from the state represented by point 81 to the state represented by point 83. At the state represented by point 83, the state computer 53 delivers information on circuit 58 to the phase control 61 which causes the phase control 61 to issue a command on circuit 62 to the phase-shifting transformer 23 to insert a 30° phase lead between bus 27 and generator 21. The system state, therefore, jumps from point 83 to point 84 in FIG. 3. The trajectory continues along the characteristic curve 67, passing along a trajectory represented by line 86 to the state represented by point 87. At the state represented by point 87 the speed of the generator 21 has been brought back to normal, the speed of the load 28 has been brought back to normal, the phase angle between buses 27 and 29 is approximately 60° which is the correct phase for the steady state operation of the remaining lines 32 and 33 with the power level $P_2$ and, therefore, the state computer 53 transmits information on circuit 58 to the phase control 61 which causes it to issue a command on circuit 62 which removes the 30° phase lead which was inserted by phase-shifting transformer 23 and restores the direct connection through non-phase-shifting transformer windings between circuits 22 and 24. The state of the system drops from point 87 to point 88 on the steady state power angle characteristic curve 67 at the steady state power level $P_2$ and at the required phase angle. In FIG. 3, the equal area criterion has been satisfied in the sense that the cross-hatched area above line $P_2$ plus the transient losses converted to area equals the cross-hatched area below line $P_2$. The cross-hatched area above line $P_2$ is the area below trajectory of line 86 between points 87 and 89 and represents the energy abstracted from the inertia of the generator 21 and delivered to the electrical system. The cross-hatched area below line $P_2$ in FIG. 3 is that which lies above trajectory of line 82 between states 81 and 83 and above trajectory of line 86 between states 84 and 89 and represents the energy delivered to the inertia of generator 21 during the time that it took the transient to progress from state 81 to state 89. During all this time, the inertia was being accelerated.

The phase control 61 in FIG. 1 calculates two running computations and one decision function. The first running computation in phase control 61 is the calculation of the area 1 in FIG. 2 which lies above trajectory of line 71 and below power level $P_2$ between phase A and whatever phase the system has at the instant of time for which the calculation is made. This running calculation, therefore, starts off with zero area and the area continuously increases in time being the proportion of area 1 which has been swept out up to the time of the calculation. The second running calculation in phase control 61 is the area lying above the power level $P_2$ and below trajectory of line 74, terminating at state 76 and starting at the presently existing state presuming that the phase-shifting transformer were to be inserted at the presently existing instant of time. It is, therefore, an area much greater than the area 2 which diminishes down to the area 2.

The first running computation is $$C_1(\theta) = \int_A^\theta (P_2 - P_r) d\theta \quad (4)$$

where A is the initial phase.

The second running computation is $$C_2(\theta) = \int_\theta^B \left\{ \sin\left(\theta + \frac{\pi}{6}\right) - P_2 \right\} d\theta \quad (5)$$

where $$B = \frac{\pi}{2} - \cos^{-1} P_2 \text{ radians} \quad (5a)$$

The decision is a function of $$C_2(\theta) - C_1(\theta) \quad (6)$$

When $C_2 - C_1$ is positive, the phase shift transformers should be left in their normal connection. When $C_2 - C_1$ passes through zero or goes negative, the phase shift transformer 23 should insert the 30° phase shift. The decision function is insert $\pi/6$ radians lead when $$C_2 - C_1 \leq 0 \quad (7)$$

When the state represented by point 76 is reached, the phase shift should be removed. This state can be determined as the maximum excursion of the phase lag angle. The condition for the removal of the phase shift and the restoration to normal is given by the simultaneous satisfaction of the following two equations.

$$\frac{d\theta}{dt} \leq 0$$

$$\theta < \left(\frac{\pi}{2} + \cos^{-1} P_2\right) \quad (8)$$

The Equations 4, 5, 6, 7 and 8 which are utilized by the phase control 61 are also applicable to the mode of control shown in FIG. 3.

In case there are amortisseur losses in the generator and the load, these can be inserted in the computations and will yield the following running computations.

$$C_3 = \left[ K \int_A^\theta (P_2 - P_r) d\theta \right]^{1/2} - \int_{t_A}^{t_\theta} (\text{power losses}) dt \quad (9)$$

K in Equation 9 has units of watt seconds squared per radian and converts the area measure in FIG. 2 into a watt-second measure. The limits $t_A$ and $t_\theta$ in Equation 9 are the time of the start at the state represented by point 68 and the time of calculation, respectively. The second running computation is $$C_4 = \left[ K \int_\theta^B \{\sin(\theta + \alpha) - P_2\} d\theta \right]^{1/2} + \int_t^{t_B} (\text{expected losses}) dt \quad (10)$$

Alpha in Equation 10 is the quantity of transformer phase change provided. In Equation 10 $t_B$ is the expected time of arrival at the state represented by point 76 or 87. The kernel of the last integration is an equation for the expected losses in the amortisseur winding during the deceleration period along the trajectory of line 74. The first control function is to insert alpha radians phase lead when $$C_4 - C_3 \leq 0 \quad (11)$$

The second control function is the same as Equation 8 and removes the phase lead of alpha radians when the derivative of the phase lag angle with respect to time is negative and the actual magnitude of the phase lag angle is less than $\theta_x$ where $\theta_x$ is the stability limit given by $$\theta < \theta_x$$

and $$\theta_x = \left(\frac{\pi}{2} + \cos^{-1} P_2\right) \quad (12)$$

If the amount of phase shift available in the phase-shifting transformer 23 is small and the amount of load carrying capability on the transmission line which is lost is very large, then it may not be possible to reach the final state in only two decisions of the phase control 61. This situation is illustrated in FIG. 4 and shows the sequence of decisions which must be computed and delivered by the phase control 61 for the optimum mode of control for a transformer 23 whose phase lead is limited to 20°.

Figure 4A:
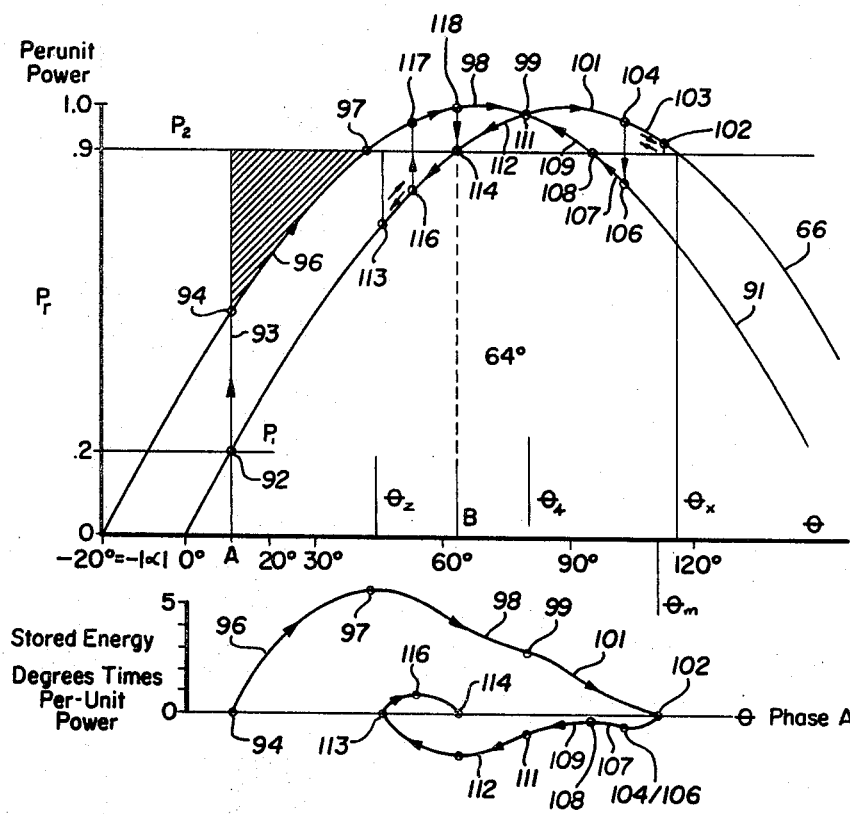
FIGS. 4A and 4B are graphs that are similar to those in FIGS. 2 and 3 but for a different quantity of phase shift in the phase shift transformer.

In FIG. 4A, the abscissa is degrees phase shift between bus 27 and bus 29. The ordinate is per unit power on the same scale as in FIGS. 2 and 3. Curve 66 is the power angle curve of the normal system. Curve 91 is the power angle curve of the system including the 20° phase lead provided by the transformer. The initial power on the remaining lines 32 and 33 is shown by line $P_1$ which produced the state represented by point 92 initially. The final power on the remaining lines 32 and 33, which is the total power being handled by the system, is shown by line $P_2$. The optimum control, starting at the state represented by point 92, when the breaker removes one of the transmission lines, is to insert the phase shift transformer immediately so that the state moves up along line 93 to point 94 and then continues on trajectory of line 96 to point 97. When it reaches point 97, the rotor of the generator will have extra energy stored in it represented by the area crosshatched less losses converted to area 11. This is the area below the total power line $P_2$, above line 96, between the states represented by points 94 and 97. After reaching the state represented by point 97, the generator rotor starts to slow down. It passes along a trajectory shown by line 98 to the state represented by point 99. At point 99, in order to maximize the rate of slowing down of the generator rotor, one should use the highest possible power angle curve. To the right of point 99, curve 66 lies above curve 91. Therefore, at the state represented by point 99, the phase shift transformer 23 is removed from the circuit and the system is operated on curve 66 which is the normal connection. The trajectory of the transient, therefore, passes from point 99 along a trajectory shown by line 101 to its maximum excursion point 102. The area above power line $P_2$ and below line 98 between points 97 and 99, and below line 101, between points 99 and 102, plus the losses during the transient converted to area is equal to the area 11 crosshatched.

The state represented by point 102 has the maximum excursion angle of the generator rotor, and occurs when the generator speed is exactly synchronous. Following this state, the generator begins to slow down and the state trajectory re-traces on curve 66 the trajectory shown by line 103 to the state represented by point 104. At the point 104, the phase shift transformer is re-inserted, shifting operation to characteristic curve 91 and shifting the state to point 106. The rotor begins to speed up along trajectory shown by line 107 and reaches point 108 at approximately synchronous speed. The area above line $P_2$ and below line 103, between point 102 and point 104 must be greater than the area below line $P_2$ and above line 107 between point 106 and point 108. If this inequality is satisfied, the trajectory will pass through point 108 and continue along line 109 to the state 111. Following point 111, one wishes to have the lowest characteristic curve which is curve 66 which lies below curve 91. Therefore, the phase shift provided by the transformers 23 is removed from the system at point 111 and the system continues in its normal circuit along line 112 to its maximum negative excursion state at point 113. The area above line $P_2$ and below line 109 between points 108 and 111, plus the area above line $P_2$ and under line 112 between point 111 and point 114 is approximately equal to the area below line $P_2$ and above curve 66 between points 114 and 113. At point 113, the generator is again running synchronously with the correct speed but with the wrong torque angle. In this case, the angle advance of the generator is not as great as it should be for the steady state. The state represented by point 113 can be considered exactly equivalent to initial state 68 in FIG. 2 or to initial state represented by point 81 in FIG. 3, and the simplified controls derived for these FIGS. 2 and 3 are applicable for the transients following the state represented by point 113 in FIG. 4. The normal circuit connection is used for the trajectory from point 113 to a point 116. At point 116, the 20° phase shift is inserted in the system and the state moves to point 117, after which it moves along curve 91 to point 118, at which state the phase shift provided by the transformer 23 is removed and the state goes to point 114 which is the desired final steady state at a 64° phase angle and a power level of 0.9 per unit.

Figure 4B:
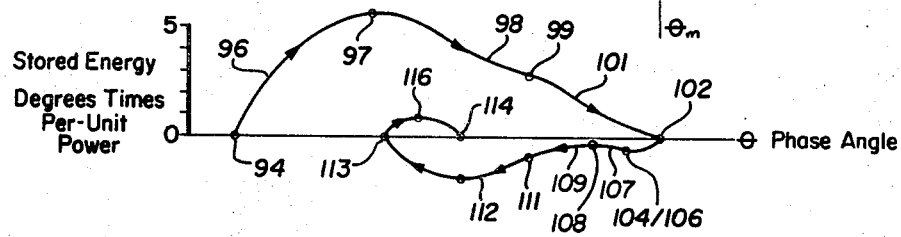

Another form of explanation for this transient control is provided by FIG. 4B which is a portion of FIG. 4A. The abscissa in FIG. 4B is identical to the abscissa in FIG. 4A and should be used in conjunction with it. The ordinate in FIG. 4B is a unit of energy squared stored in the generator inertia, in this case in degrees times per unit power. At the initial state representated by point 92, there is no initial stored energy discrepancy and the initial state is moved to point 94 by the insertion of the phase shift of the transformers. As the rotor accelerates along trajectory shown by line 96, the stored energy rises until it reaches a maximum at point 97, following which the rotor is decelerated along a trajectory shown by line 98 to a point of minimum rate of deceleration at point 99. To increase the rate of deceleration, the transformer phase shift is removed and the normal circuit connection is used along the trajectory shown by line 101 which has the maximum possible rate of deceleration realizable with the system components. The differential stored energy reaches zero at point 102 at which the angle of the rotor has its maximum forward advance and will thereafter diminish. The rotor slows down to point 104 and is then speeded up again along a trajectory shown by line 107 to point 108. Point 108 is specifically chosen to have a small amount of negative stored energy so that the rotor is slowing down. If it were not slowing down but were speeding up, the phase angle would be increasing and the system would increase until the generator had slipped a pole or lost synchronism and would have to be removed from the power system. By keeping the state represented by point 108 in the negative energy difference region, the trajectories are assured a left-hand direction in FIGS. 4A and 4B and will continue in the deceleration region along line 109 to point 111. To minimize the rate of deceleration, the operation is changed from the characteristic of curve 91 to the characteristic of curve 66 by removing the 20° phase lead. After the transformers 23 have been removed, the system moves along line 112 in FIG. 4B with a minimum rate of deceleration until the stored energy goes to zero at point 113. The direction of motion along the phase angle coordinate reverses and the rotor begins to accelerate reaching the state represented by point 116 at which the equal angle criterion requires that the 20° phase lead be inserted in order that during the final trajectory of the system from state 117 to 118 the speed and the angle of the generator shall both reach their steady state values at the state represented by point 118 simultaneously. Following this condition which corresponds to no stored energy difference, the 20° phase lead of the transformer is removed to establish the steady state represented by point 114.

The sequence of commands and transitions shown in FIG. 4 are based upon the information provided by the state computer 53 in FIG. 1 and the computations performed by the phase control 61. There are two types of computations in the phase control 61. The first type is the calculation of parameters and constants which will be needed, and the second type is a running computation involving integrals with respect to a variable and decisions. Among the calculations of the first type are Calculate B from Equation 5a Calculate $\theta_x$ from Equation 12b $$\theta_y = \left(\frac{\pi}{2} - \frac{\alpha}{2}\right) \tag{13}$$

Calculate $\theta_m'$ from $$\int_A^{B-\alpha} [P_2 - \sin(\theta+\alpha)]d\theta = \int_{B-\alpha}^{\theta_m'} [\sin(\theta+\alpha) - P_2]d\theta \tag{14}$$

Calculate $\theta_m''$ from $$\int_A^{B-\alpha} [P_2 - \sin(\theta+\alpha)]d\theta = \int_{B-\alpha}^{\theta_y} [\sin(\theta+\alpha) - P_2]d\theta$$
$$+ \int_{\theta_y}^{\theta_m''} (\sin\theta - P_2)d\theta \tag{15}$$

For a solution to exist for Equation 14, $\theta_m'$ must be less than $\theta_x-\alpha$. For a solution to exist for Equation 15, $\theta_m''$ must be more than $\theta_y$ and less than $\theta_x$. A sequential computer program which can be carried out by the phase control 61 for the mode of operation illustrated in FIG. 4 using the constants previously evaluated could be as follows.

Command:
30  If $\theta_m'<B$ (if not, go to comand 33), do not insert the phase lead $\alpha$ initially, but wait until
31  $C_4-C_3\leq 0$, then insert the phase lead $\alpha$.
32  When $d\theta/dt\leq 0$, remove the phase lead $\alpha$.

Stop and reset computer:
33  If $\theta_m'>B$, insert the phase lead $\alpha$ immediately.
34  If $\theta_m'\leq\theta_y$ and $d\theta/dt\leq 0$, then remove the phase lead $\alpha$.

Go to command 38:

35  If $\theta_m''>\theta_y$ and $\theta\geq\theta_y$, then remove the phase lead $\alpha$.
36  If $\theta_m'<(\theta_x-\alpha)$ (if not, go to command 43), then when $d\theta/dt\leq 0$, insert the phase lead $\alpha$.
37  When $\theta\leq\theta_y$, remove the phase lead $\alpha$.
38  When $d\theta/dt=0$, changing from negative to positive, record in the memory the angle $\theta_z$.
39  While $d\theta/dt>0$, calculate $$C_5=\left[K\int_{\theta_z}^{\theta}(P_2-P_r)d\theta\right]^{1/2}-\int_{t_z}^{t}(\text{power losses})\,dt \quad (16)$$

40  And while $d\theta/dt>0$, calculate $$C_6=K\left[\int_{\theta}^{B}\{\sin(\theta+\alpha)-P_2\}d\theta\right]^{1/2}+\int_{t}^{t_B}(\text{expected losses})\,dt \quad (17)$$

Command:
41  When $C_6-C_5\leq 0$, insert the phase lead $\alpha$.
42  When $d\theta/dt\leq 0$, remove the phase lead $\alpha$.

Stop and reset computer:
43  If $\theta_m''>(\theta_x-\alpha)$, and $$\int_{\theta_m}^{\theta}(P_r-P_2)d\theta\leq\int_{\theta}^{\theta_x-\alpha}[P_2-\sin(\theta+\alpha)]d\theta \quad (18)$$

starting the integrations when $d\theta/dt=0$ at $\theta_m$, then insert the phase lead $\alpha$. (The above step accomplishes the switching from state at point 104 to state at point 106).

44  When $\theta\leq\theta_y$, remove the phase lead $\alpha$.
45  Go to command 38.

A different kind of computer program can be based on state logic instead of the state sequences used above. In the state logic case Command:
50  If $(\theta_m'-B)>0$, and $(\theta_y-\theta)>0$, and $d\theta/dt>0$, and $d\theta/dt$ has never been negative, then insert the phase lead $\alpha$.
51  If $(\theta-\theta_y)d\theta/dt>0$, then remove the phase lead $\alpha$.

Command:
52  If $(C_6-C_5)>0$, when either $(\theta_m'-B)<0$, or $(\theta-\theta_y)d\theta/dt<0$, then start with no phase lead $\alpha$ and insert the phase lead $\alpha$ when $(C_6-C_5)\leq 0$.

In the state logic program immediately above, when $(\theta-\theta_y)>0$, use $\theta_m$ for $\theta_z$ and use $(\theta_x-\alpha)$ for B in the $(C_6-C_5)$ criterion.

It is possible that the computation performed by the phase control 61 may be in error, either because of incomplete knowledge of the system and correspondingly inaccurate parameters stored in the computer, or because of inaccuracies in the information received by the state computer 53, or because of other transients elsewhere in the system being coupled into the portion being controlled. In a system with these shortcomings, the decision causing switching from the state represented by point 72 to the state represented by point 73 (FIG. 2) or from the state represented by point 83 to the state represented by point 84 or from the state represented by point 116 to the state represented by the point 117 (FIG. 4A) may be either too early in time at too small an angle $\theta$ or too late in time at too large an angle $\theta$.

Figure 5:
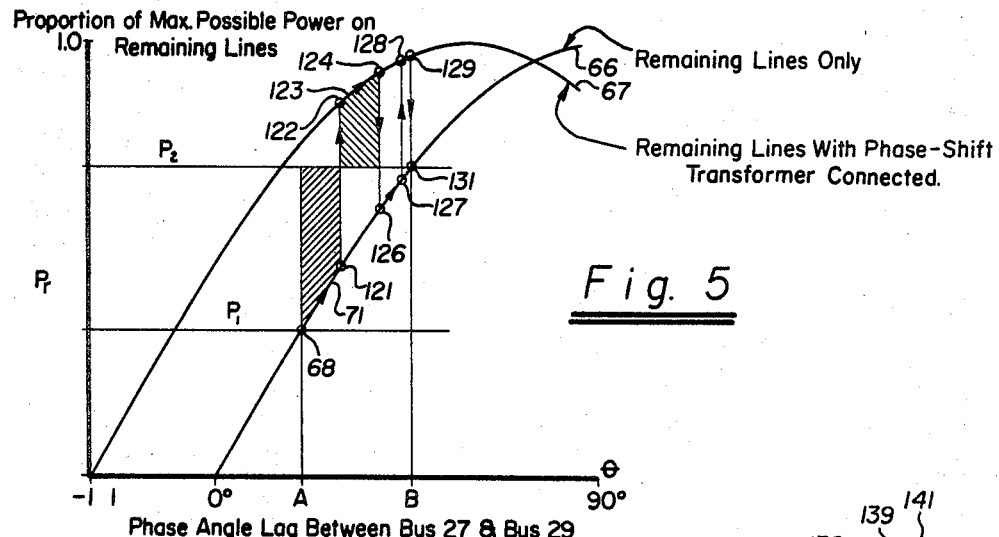
FIG. 5 is a graph illustrating the performance of the system shown in FIG. 1 utilizing an approximate rather than an exact control.

FIG. 5 shows the performance of the system with the practical limitations of small errors in the computation. FIG. 5 has the same coordinates as FIG. 2 and it has the same type of characteristic curves 66 and 67 as in FIG. 2. It has the same initial state 68 and the same final power flow $P_2$. In both FIGS. 2 and 5, the initial trajectory shown by line 71 starts from initial state 68. In FIG. 5, however, the criteria for switching which should occur at point 72 (see FIG. 2) occurs too early at a state represented by point 121. After the insertion of the transformer phase lead $\alpha$, the state is at point 122 and proceeds along a trajectory of line 123 to the maximum angle possible on curve 67 at a state represented by point 138, where the rate of change of phase angle with respect to time is zero. The computer logic, therefore, removes the phase lead $\alpha$ and brings the state to point 126 on the characteristic curve 66. This is accomplished either with command 32 or command 51. In both cases, the computer starts a new computation as though there were new transients. It, therefore, considers the state represented by point 126 as the initial state for a new transient which is long to go to a final power flow of $P_2$. It schedules the trajectory along characteristic curve 66 to a state represented by point 127, at which it calculates that the phase shift $\alpha$ should be inserted which takes the system to a state represented by point 128. The trajectory further continues to a state represented by point 129, at which point command 32 or command 51 removes the phase lead $\alpha$ and brings the system to the final state represented by point 131. It can be seen in FIG. 5 that the effect of inaccuracies in constants stored in the computer may result in a slightly longer time to remove the transients and in extra operations of the circuit breakers which insert and remove the transformer phase lead. The system will, however, reach its final value in a good engineering fashion with no overshoot of the phase angle for the phase shown in FIG. 5.

Figure 6:
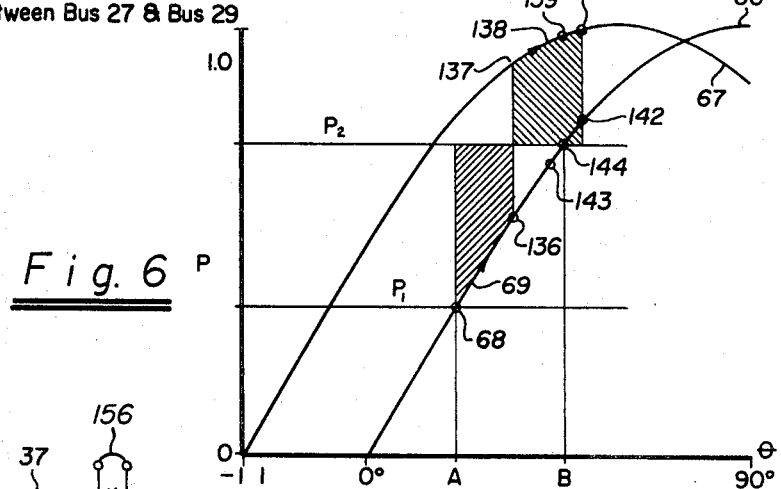
FIG. 6 is a graph showing another graphical explanation of the operation of FIG. 1 utilizing an approximate rather than an exact control.

FIG. 6 shows another example of the effect of improper computations in the phase control 61. FIG. 6 is the same as FIG. 2 with the same coordinates and the same characteristic curves 66 and 67. It has the same initial state 68 and the same final power flow $P_2$. In FIG. 6, the computer schedules the transient along a trajectory represented by line 69 from the initial state 68, but instead of inserting the phase lead $\alpha$ at a state represented by point 72 (see FIG. 2), the computational error causes the insertion of the phase lead $\alpha$ to be delayed to state 136. The system then goes through a state represented by point 137, through a trajectory shown by line 138 and passes through a state represented by point 139 which has the correct final angle B but has too much velocity stored in the inertia of the generator 21. The phase lead $\alpha$ should not be removed when the system reaches point 139 because of the excess energy stored in the inertia. The value of the final angle B is not the correct criterion to use for restoring the system to the characteristic curve 66. Instead, the proper thing to do is to permit the system to proceed to a state represented by point 141, at which state command 32 or command 51 will remove the phase lead and take the system to a state represented by point 142. If the computer were disabled at this point, the system would oscillate from a state represented by point 142 to a state represented by point 143 and eventually reach the state represented by point 144 in a damped oscillatory fashion, typical of oscillations commonly observed in all power systems today. Or, alternatively, if the computer is not disabled following the state represented by point 143, the computer will begin a new transient computation when it reaches the state represented by point 143 and can control the system such that it goes from the state represented by point 143 to the state represented by point 144 in a deadbeat fashion by means of one additional pair of commands inserting and removing the transformer phase lead α.

Figure 7:
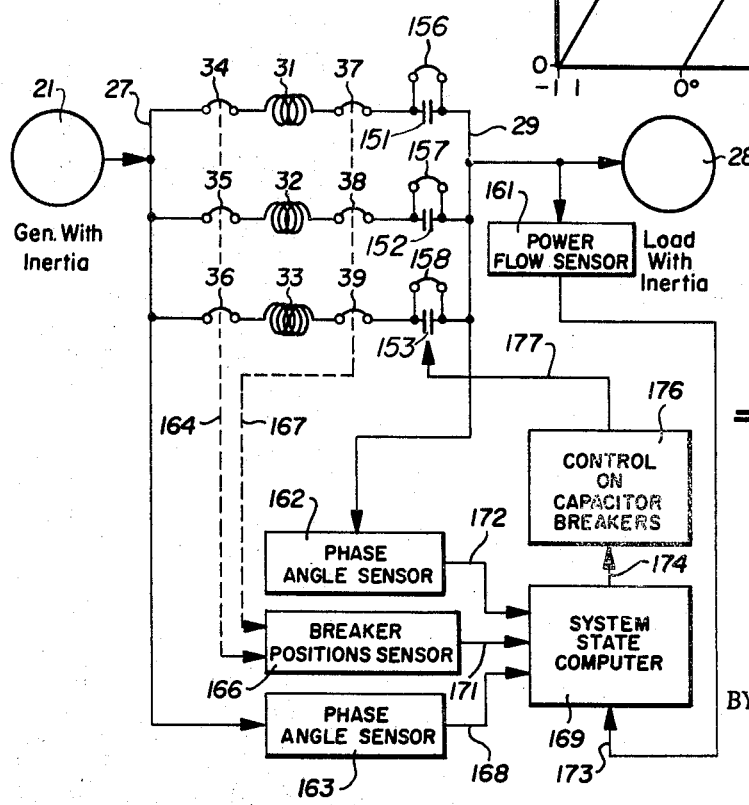
FIG. 7 is a block diagram of another embodiment of the present invention illustrating a generator with inertia supplying a load with inertia through three parallel transmission lines which have in series with each a static capacitor which can be inserted or removed by the control computer.

FIG. 7 shows an embodiment of a power system incorporating the present invention in which the transients are controlled through the insertion and the removal of short time rating static capacitors in series with one or more transmission lines. Banks of static capacitors 151, 152 and 153 are placed in the three transmission lines 31, 32 and 33 and circuit breakers 156, 157 and 158 are in parallel with the capacitor banks 151, 152 and 153 and normally short them out. Each bank is a three-phase bank of series capacitors. In each phase of this three-phase bank is one pole of the associated three-phase circuit breaker which normally shorts out each capacitor.

The three-phase bus 29 is connected to the input of a power flow sensor 161. The three-phase bus 29 is also connected to the input of a phase angle sensor 162. The three-phase bus 27 is connected to the input of a phase angle sensor 163. The states of the open or closed positions of the circuit breakers 34–36 are carried by the set of communication channels 164 to a breaker positions sensor 166. The states of the open or closed positions of breakers 37–39 are carried by the set of communication channels 167 to the breaker positions sensor 166. Information from the phase angle sensor 163 is transmitted by communication link 168 to the system state computer 169. Information from the breaker positions sensor 166 is transmitted by communication channel 171 to the system state computer 169. Information from the phase-angle sensor 162 is carried by communication channel 172 to the system state computer 169. Information from the power flow sensor 161 is carried by communication channel 173 to the system state computer 169. A system state vector whose components are all of the present measurements and all of the measurements prior to a fault, is delivered by the system state computer 169 on the communication channel 174 to the control on the circuit breakers 176 which is a form of analog or digital computer, and which has means for energizing the actuating mechanisms on the capacitor circuit breakers 151–153 through communication channels 177.

The mode of operation of the control in FIG. 7 is explained in FIG. 8.

The abscissa in FIG. 8 is the phase lag from bus 27 to bus 29. The ordinate in FIG. 8 is the per unit power flow based on the maximum possible power flow on the remaining lines following a fault. This is called $P_r$. The relationship between power flow and phase angle lag on the remaining lines following a fault when the series capacitors are shorted out is given by curve 181 in FIG. 8. The relationship between power flow and phase lag on the remaining lines following a fault when the series capacitors are inserted in series with the remaining lines is given by the characteristic curve 182 in FIG. 8. The initial state of the system prior to the fault was a state represented by point 183 in FIG. 8 with a per unit power $P_r$ of 0.63, at the initial power level given by line 184. The total power flow prior to the fault and which must be established in the remaining lines eventually following the fault is given by the horizontal line 186 which is at a level of $P_r$ of 0.94. The system in FIG. 7 is controlled through the sequence of states shown in FIG. 8 by the system state computer 169 and the control on the circuit breakers 176. Beginning with initial state represented by point 183, the circuit breakers 151–153 on the series capacitors are open to insert the series capacitors in series with the remaining transmission lines immediately following a fault which removes one or more of the transmission lines.

The state goes from point 183 to point 187 in FIG. 8 on the characteristic curve 182. Because point 187 represents less power flow than the total given by line 186, the rotor of the generator 21 will accelerate and the state will follow the trajectory of line 188 until it reaches point 189. Here, the power flow on the transmission line is equal to the power being delivered to generator 21, but the velocity of the rotor of generator 21 is too high representing too much stored energy in the inertia, and the phase angle of the rotor is too low which means that it must advance even further in phase. Continuing on the trajectory represented by line 191, the rotor is slowed down as it approaches the state represented by point 192 while the series capacitors remain inserted in the transmission lines. At the state represented by point 192, the speed of the rotor is exactly synchronous, and the phase angle is proper for the steady state phase shift which must exist between bus 27 and bus 29 to transmit the power represented by the level 186. When the time rate of change of phase lag θ goes through zero towards a negative value, the control on the circuit breakers 176 shorts out all of the series capacitors and brings the state to point 193. There is no further transient or oscillation.

This sequence of controls produces a deadbeat transient going from the initial state represented by point 183 to the final state represented by point 193 with no overshoot. It can be seen in FIG. 8 that there is a unique relationship between the reactance of the remaining transmission lines, the reactance of the capacitors inserted, and the change in power. For this unique relationship, the capacitors are inserted at the initiation of the fault. For large ratios of capacitive reactance to power change, the capacitor insertion should be delayed in time. For small ratios of capacitive reactance to power change, the capacitor should be inserted immediately but more than two breaker operations will be required to bring the system to its final state in a deadbeat tangential fashion.

FIG. 9 shows the controls and the mode of operation of the power system of FIG. 7 for the case when the ratio of power change to capacitive reactance is small. In FIG. 9, the abscissa and ordinates are the same as in FIG. 8 and the characteristic curves 181 and 182 are the same as in FIG. 8. The initial power flow at level 196 in FIG. 9 is not necessarily the same as the initial power flow 184 in FIG. 8. The final power flow 197 in FIG. 9 is less than the final power flow 186 in FIG. 8. The initial state is given by the intersection of the initial power flow line 196 and the characteristic curve 181 at point 198. The final desired state is represented by the intersection of the final power flow line 197 and the characteristic curve 181 and occurs at point 199. The sequence of controls produced by the control 176 starts at the state represented by point 198 and the system progresses on a trajectory represented by line 201 coincident with characteristic curve 181 to a state represented by point 202 at which time the computer 169 calculates that the series capacitors 152 and 153 should be inserted. Following the insertion of the series capacitors 152 and 153 the state changes from point 202 to point 203. The system continues to swing to increasing phase angles from bus 27 to bus 29 as shown by point 204 and the trajectory represented by line 206. At the state represented by point 204, the power flow through the remaining transmission line is equal to the power being delivered to the generator and there is no torque tending to accelerate or decelerate the rotor of the generator 21. However, the generator 21 has energy stored in it represented by the area under curve 197 and above trajectory 201 between point 198 and point 202 and above a portion of the trajectory on curve 182 between points 203 and 204. The rotor's excess energy must be removed by slowing it down in such a fashion that it reaches its correct steady state angle at the correct synchronous speed. This is accomplished by letting it swing along the trajectory represented by line 206 to the state represented by point 207 where these two conditions are satisfied. At the state represented by point 207, the computer 169 issues a command to restore the system to normal by shorting out the series capacitors 152 and 153 and following this action, the system state goes to point 199. This sequence of decisions for optimum control of the system in FIG. 7 can be carried out by computations similar to those which have been given in detail for the computer 53 in FIG. 1.

FIG. 10 illustrates the control of a system like that in FIG. 7 for which the characteristic of the remaining lines without capacitors is given by curve 181 on coordinates of power in per unit of the maximum possible on the remaining lines without the capacitors versus the phase lag from bus 27 to bus 29. In FIG. 10, the characteristic curve 211 is for the power versus angle of the remaining lines after the series capacitors have been inserted and are carrying current. FIG. 10 is shown for a transient in which the ratio of power change to capacitive reactance is large. The initial power flow through the remaining lines is given by the level of line 212, and the total power flow prior to the fault and which must be carried eventually by the remaining lines is given by the level of the line 213. The initial state represented by point 214 is at the intersection of line 212 and characteristic curve 181. The final desired state is represented by point 216 at the intersection of total power line 213 and characteristic curve 181. At the initiation of the fault, the control 176 inserts the series capacitors and changes the state from point 214 to point 217. The system swings on the trajectory represented by line 218 and the trajectory represented by line 219 to a maximum angle given by point 221. At this state, the capacitors are shorted out and the system operates with power flow through the remaining lines only. The state changes from point 221 to point 222 and the rotor of the generator 21 begins to slow down causing the phase angle to move along the trajectory represented by line 223 and along the trajectory represented by line 224 to a minimum angle excursion given by point 226. At the state represented by point 226, an equal area criterion calculation is started and this produces a transient which moves to larger angles and larger power back along the trajectory of line 224 to the state represented by point 227 where the stored energy calculation shows that the series capacitors should be re-inserted. When the control 176 re-inserts the series capacitors, the system moves from a state represented by point 227 to a state represented by point 228 on the characteristic curve 211. The rotor of generator 21 begins to slow down along a trajectory represented by line 229 and reaches its rated synchronous speed at its desired final steady state at point 231. At this state, the control 176 shorts out the capacitor banks in series with the transmission lines and brings the system to a state represented by point 216. There is no further transient oscillation. The computations and controls shown in FIG. 10 can be carried out by computer 169 in a manner closely analogous to the computer program given in detail for FIG. 1.

Figure 11:
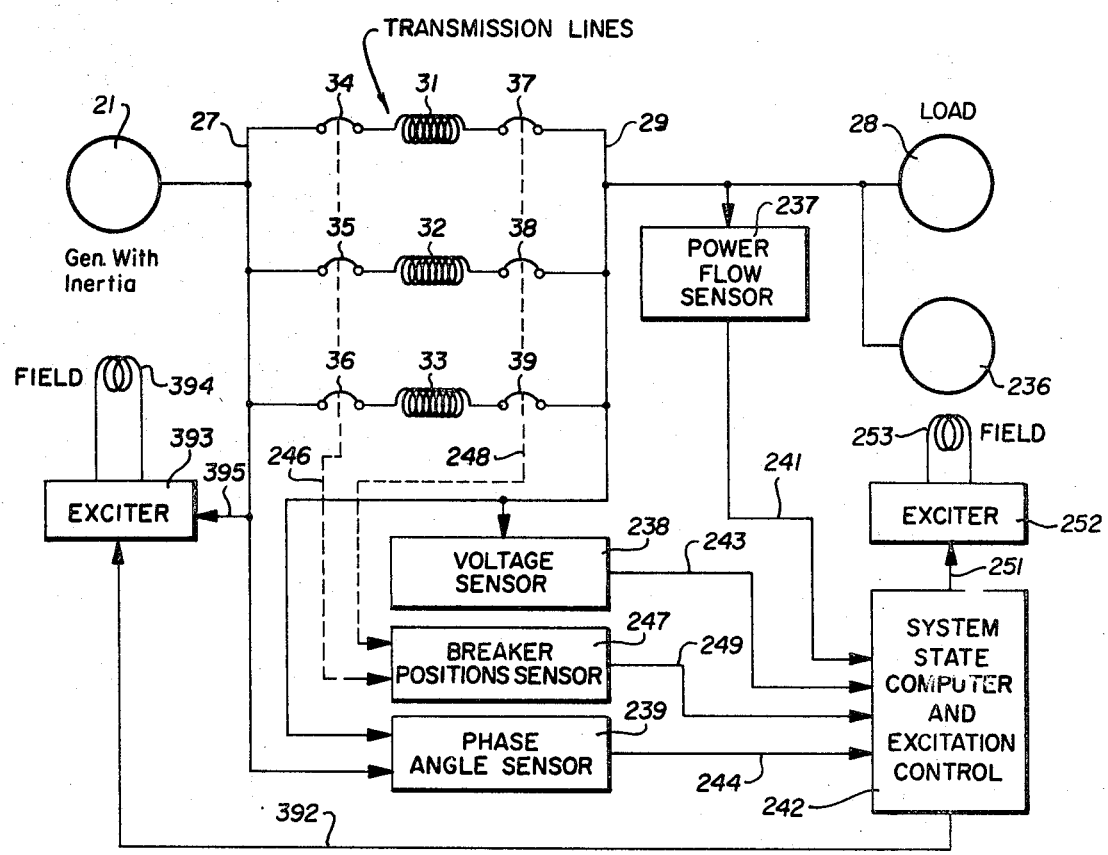
FIG. 11 is a block diagram of another embodiment of the present invention applied to a system consisting of a generator with inertia, three parallel transmission lines, and the parallel combination of a load absorbing power and a synchronous condenser with inertia, the field current of the synchronous condenser being controlled by a computer actuated by the transient.

FIG. 11 is a third embodiment of this invention applied to control the transient in a power system involving a generator 21 with inertia and a load 28 with inertia, through the excitation control of one of the synchronous machines in the system. FIG. 11 shows the generator 21 with inertia supplying power to a three-phase bus 27 which is connected to three parallel three-phase transmission lines 31, 32 and 33 through three-phase circuit breakers 34-36. The three transmission lines 31, 32 and 33 are connected through three-phase circuit breakers 37, 38 and 39 to a three-phase bus 29. The three-phase bus 29 is connected to a load 28 and to the synchronous condenser 236 with inertia. Bus 29 is also connected to a power flow sensor 237 which measures the power flowing from bus 29 to the parallel combination of load 28 and condenser 236. Bus 29 is also connected to a voltage sensor 238 and also is connected to a phase angle sensor 239. Bus 27 is also connected to the phase angle sensor 239. The power flow sensor 237 delivers the measured power flow information on communication channel 241 to a system state computer and excitation control 242. The voltage sensor 238 delivers voltage information on communication channel 243 to system state computer and excitation control 242. The phase angle sensor 239 delivers phase information on communication channel 244 to the system state computer and excitation control 242.

The open or closed position of breakers 34, 35 and 36 is transmitted by a set of circuits 246 to the breaker position sensor 247. The open or closed position information concerning breakers 37, 38 and 39 is transmitted on a set of circuits 248 to the breaker position sensor 247. The information from the breaker position sensor 247 is transmitted on a communication channel 249 to the system state computer and excitation control 242. Computer 242 calculates and delivers commands on circuit 251 which are received by an exciter 252 which controls the current in the field 253 of the synchronous condenser 236.

In FIG. 11, the normal operating condition is for generator 21 to have power supplied to its shaft by a prime mover, and for it to deliver three-phase alternating current power to bus 27. This power flows through the several parallel circuits to bus 29 and to load 28. This invention is applicable to two or more parallel transmission lines as shown in FIG. 11. The synchronous condenser 236 is used to control the voltage of the load and also to provide reactive KVA so that the long transmission lines do not have to carry an excessive reactive KVA or operate with a large angle between the current and the voltage in each phase. Under normal operating conditions, the voltage sensor 238 measures the voltage on the bus 29 and transmits this information on information channel 243 to the excitation control 242. During steady state operation, the measured voltage is compared with a desired steady state voltage, and the difference signal is amplified to provide a command to the exciter 252 which adjusts the field current in the field 253. This is a negative feedback voltage regulator and acts to hold the voltage on bus 29 at approximately the value preselected.

The voltage sensor 238 receives information from bus 29 and delivers information on communication channel 243 to system state computer and excitation control 242 which further transmits this information after processing on communication channel 251 to exciter 252. Exciter 252 controls the current in the field 253 for the synchronous condenser 236. This feedback loop is a voltage regulator and can be used to hold the voltage on bus 29 constant. Holding the voltage on bus 29 constant is not the same thing as holding the excitation in condenser 236 constant and is not necessarily the same thing as holding the voltage at the terminals of condenser 236 constant. Also shown in FIG. 11 is a connection 395 from bus 27 to a exciter 393. The output of exciter 393 is a current through field 394 on generator 21. The terminals of generator 21 are connected to bus 27. This provides a feedback loop which is a voltage regulator for bus 27, and can be used to hold the voltage on bus 27 constant in the normal steady state. Holding the voltage on bus 27 constant is not necessarily the same as holding the excitation in generator 21 constant and is not necessarily the same as holding the voltage at the terminals of generator 21 constant.

In the embodiment of this invention shown in FIG. 11, additional information is provided to the excitation control 242 so that during transients the voltage regulatory function of the exciter is either augmented or replaced by a transient control function. The transient control function can either increase or decrease the current in the field 253 in such a manner that after the detection of a transient, the new steady state is established with the least disturbance to the system. A typical form of transient would be a fault or short circuit on one of the transmission lines 31–33. If, for example, a fault were to occur on transmission line 31, fault detection relays would open the circuit breakers 34 and 37. If these breakers have automatic reclosing following a specified time, they might be reclosed, reconnecting the transmission line 31 between buses 27 and 29. If, in addition, the fault had not cleared on line 31 during the time that the breakers 34 and 37 were open, then these breakers would open a second time and might remain open. If following the above described sequence of events, or in the case of non-automatically reclosing breakers, the transmission line 31 were to be removed from service for a significant period of time, then the power which previously flowed through line 31 would have to flow through lines 32 and 33. This requires that the phase of the voltage on bus 27 advance in angle and the phase of the voltage on bus 29 decrease in angle. These changes in phase require that the generator 21 with inertia advance in phase and the synchronous condenser 236 with inertia be retarded in phase. It is not possible to change the phase of the generator without first storing extra energy in the rotor to accelerate it and, then secondly removing this extra energy from the rotor to decelerate it and bring it back to the correct synchronous speed at the correct new phase angle. The pupose of the excitation control 242 is to provide an optimum sequence of events that will bring generator 21 and the synchronous condenser 236 to their new phase angles with a minimum of oscillations in the system. This mode of control can be explained with reference to FIG. 12.

Figure 12:
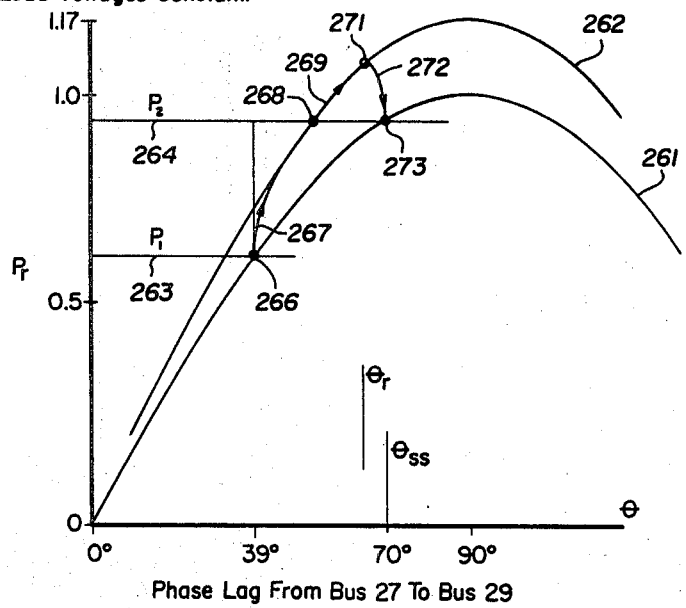
FIG. 12 is a graph showing the mode of operation of the embodiment in FIG. 11 on coordinates of power flow versus phase lag between generator and synchronous condenser for one condition of the system.

FIG. 12 is a plot of the per unit power in the remaining lines following a transient based on the maximum possible power on these remaining lines following a transient holding both the generator and the synchronous condenser voltages constant. This per unit power is called $P_r$. The abscissa in FIG. 12 is the phase lag between bus 27 and bus 29. Curve 261, which has a sinusoidal shape, is a characteristic curve relating the power flow on the remaining transmission lines to the phase angle between the buses at rated generator and synchronous condenser excitations. Curve 262 in FIG. 12, which also has a sinusoidal shape, is the power flow characteristic of the system with current in field 253 which has been increased to a value larger than that current which would have been used to hold the load voltage constant. The horizontal line 263 is the power level $P_1$ which is the power which flowed through the remaining lines prior to the fault. The horizontal line 264 is at the power level $P_2$ which is the total power which flowe through all the transmission lines prior to the fault and which is the power being supplied by the generator 21 and which must eventually flow through the remaining lines following the fault. The initial state of the remaining transmission lines is given by point 266 which is at the intersection of line 263 and curve 261. Immediately following the fault, the system state computer and excitation control 242 issue a command on circuit 251 to exciter 252 to increase the current in field 253. The current is inceased in this field until it reaches the characteristic shown by curve 262. The state of the system, therefore, follows a trajectory represented by line 267. This trajectory would be vertical if the time constant for change of current in field 253 were zero seconds. But because of the time delay in establishing the change of current in field 253, the trajectory represented by line 267 deviates from the vertical. The trajectory passes through the state point 268 which represents a power flow through the remaining transmission lines of $P_2$ which is exactly equal to the power being generated by generator 21 at a state wherein the inertia of generator 21 is running at too high a speed and has too much energy stored in it, and the inertia of synchronous condenser 236 is running too slow and has a deficiency of energy stored in it. To slow down generator 21, the additional excitation in the field 253 is maintained and the system state moves along a trajectory represented by line 269 to a state represented by point 271. At point 271, the system state computer and excitation control 242 calculate that the current in field 253 should be reduced and the exciter 252 drops the voltage on field 253 to rated voltage at such a time that the system state follows a trajectory represented by line 272 to the final state represented by point 273, reaching the final state with power flow through the transmission lines equal to $P_2$, a phase lag between bus 27 and bus 29 equal to the final desired steady state phase lag $\theta_{ss}$ and the speed of generator 21 equal to synchronous speed, and the speed of synchronous condenser 236 equal to synchronous speed. Because of the phase lag of the change of current in field 253 after the change in voltage provided to it by exciter 252, it is necessary for the excitation control 242 to program a sequence to restore the field to normal including compensation for the time delays in the system. For this reason, the restore to normal command is generated at the angle $\theta_r$ in FIG. 12 corresponding to a state represented by point 271. $\theta_r$ is less than $\theta_{ss}$. The sequence of events for the optimum control shown in FIG. 12 is computed by the excitation control 242 in FIG. 11 in a manner analogous to the computations performed by the phase control 61 in FIG. 1. In particular, the computer carries running integrations to evaluate the area under the curve 264 and above the curve 267 between points 266 and 268, which is a measure of the energy stored in the rotor of the generator.

In addition, the computer 242 contains a running integrator which calculates the area under trajectory represented by line 269 and line 272 and above line 264 between points 268 and 273 which is a measure of the energy removed from the rotor of generator 21 during the deceleration period. It also calculates the necessary phase lead of the state at point 271 ahead of the final steady state phase $\theta_{ss}$, as a function of the known characteristics of the exciter 252 and the field 253. The excitation control 242 provides a control on the transients excited in the system of FIG. 11 by faults which remove transmission lines, in such a manner that the transient approaches its final steady state in a tangential fashion and oscillations are minimized.

Curve 261 in FIG. 12 is a single curve constant in its position in the coordinates of FIG. 12 only if the voltage on bus 27 is constant and the voltage on bus 29 is constant and the reactance connected between the two buses is constant. In a similar manner, curve 66 in FIG. 2 which is applicable to FIG. 1 is a constant only if the voltage on bus 27 and the voltage on bus 29 are each constant and the reactance between the two buses is invariant. In a similar manner, curve 181 in FIG. 8 which is applicable to FIG. 7 is a constant only if the voltage on bus 27 is constant and the voltage on bus 29 is constant and the reactance connected between the two buses is constant. With reference to curve 262 in FIG. 12, it is different than curve 261 because the current in field 253 is for a different value and the voltage on bus 29 is different.

If the voltage on bus 27 or the voltage on bus 29 is not constant during a transient, then the curve in FIG. 12 for the transient should be drawn for this variable voltage situation. The effective curve would not necessarily be a sine wave. The lines 267 and 272 are typical of trajectories which do not follow sine waves because the excitation current is not constant.

For the case of a system like FIG. 11 in which the excitation field current for generator 21 is held constant because of the absence of a voltage regulator or because of long time constants in the voltage regulator loop, then the appropriate curves to use in FIG. 12 would be those for an abscissa of phase lag between a constant voltage at one position in the system and a constant voltage at a different position in the system. For example, one could use the voltage behind synchronous reactance in generator 21 as the constant and then the synchronous reactance of generator 21 would have to be added to the reactance of the parallel remaining transmission lines to obtain the correct value to use for curve 261. These curves will be sine waves only if the phase lag is measured between two points of constant voltage and the reactance between these two points is linear and constant.

With reference to FIG. 1 and the operating properties shown in FIG. 4, the phase lag plotted at FIG. 4 is between bus 27 and bus 29. This is a sine wave if the voltages on bus 27 and bus 29 are constant. The reactance between generator 21 and bus 27 might be significant, and there might be a point somewhere else in the system not at bus 27 which is the point at which the voltage can be considered constant. If the voltage on bus 27 changes during the transient, then curves 66 and 91 in FIG. 4 should be correspondingly altered to be consistent with this change in voltage as a function of time or of angle. One of the most important effects of this change in curve 66 or curve 91 is in the intersection of the curve with line $P_2$ at the limit of stability angle $\theta_x$ for curve 66 and at the corresponding limit of stability state 108 for curve 91. In general, if the voltage at the terminals of generator 21 is held relatively constant, then the reactance between generator 21 and bus 27 will cause the voltage on bus 27 to diminish as the phase lag angle increases, and curves 66 and 91 in FIG. 4 will be reduced in amplitude causing the limit of stability $\theta_x$ to move to the left to smaller lag angles and causing the important state point 108 on curve 91 to also move to the left to smaller lag angles for the portion of the system between bus 27 and bus 29. These effects can be calculated and properly compensated for in the state computer 53 if it contains the information concerning the voltage at the terminals of generator 21 and the reactance between that voltage point and bus 27 or if it contains the excitation information for generator 21 and the saturation curve of this generator and the vector diagram for the direct axis and quadrature axis reactance drops in generator 21 as a function of the current, and the reactance between the terminals of generator 21 and bus 27.

The curve 262 in FIG. 12 lies above curve 261 in FIG. 12 because either E or V in Equation 2 is larger for curve 262 than it is for curve 261. This means that field control for the reduction of transient swings can be applied either to generator 21 in FIG. 11 or to synchronous condenser 236 in FIG. 11. It is within the scope of this invention to apply the field control to both generator 21 and to synchronous condenser 236 in FIG. 11. With this control, both machines would be overexcited during a transient and returned to normal excitation at the end of the transient in accordance with computations carried out by the system state computer and excitation control 242 and transmitted to both machines. This is shown in FIG. 11 by the information transmission channel 392 which controls the exciter 393 and the field 394 on generator 21.

FIG. 13 is a graph of a non-linear computation that is performed in the system state computer 242 in order to produce the mode control shown in FIG. 12. The abscissa in FIG. 13 is marked W and equals the difference in the power levels $P_2$ and $P_1$ in FIG. 12 divided by the power level $P_2$. It is a per unit power change based on the total power flow. The ordinate in FIG. 13 is the required increase in excitation in order to shift the operating characteristic from the sinusoidal curve 261 in FIG. 12 up to the sinusoidal curve 262. These curves in FIG. 13 are derived from 1. E in Equation 1 is a function of the excitation in generator 21. V in Equation 1 is a function of the excitation in the synchronous condenser 236. The X in Equation 1 is a function of the parallel reactance of the several operative transmission lines, and in FIG. 12 it is the equivalent reactance between bus 27 and bus 29 of the remaining transmission lines. It can be seen from Equation 2 that the maximum value of curve 262 can be varied by changing the value of V which is accomplished by changing the excitation of the synchronous condenser 236. The change in V divided by the final steady state value of V is called the per unit increase in excitation and it is plotted in the ordinate of FIG. 13. The curve marked $P_2$ equals 1 is the non-linear curve to be used for all of those transients wherein the final state of the system is coincident with the peak curve 261 in FIG. 12 or in which the line 264 is at the power level $P_2=1$. This is the limit of steady state stability. The curve in FIG. 13 for $P_2$ very much less than 1 is to be used for all transients where both line 263 and line 264 in FIG. 12 are near the bottom of the figure in the linear range of curves 261 and 262 and at angles less than 30° or values or $P_r$ less than .5. In FIG. 13, there exists a family of curves which have not been drawn which lie between the two curves which have been drawn and are applicable for the range of powers between $P_2=1$ and $P_2=0.5$.

The system state computer in FIG. 11 uses the non-linear function in FIG. 13 as follows. The power flow sensor 237 delivers the information concerning the level of $P_2$ immediately prior to the fault. Immediately following the fault, the power flow drops to $P_1$. From these two measurements, W is calculated to be used in FIG. 13. From the breaker position sensor 247 in FIG. 11, the number of remaining lines and their locations is known and the computer refers to a table of reactances for these lines and calculates $X_r$ to be used in Equation 2. Knowing the reactance and the desired steady state final voltages at the generator bus 27 and at the load bus 29, the maximum power $P_m$ is calculated from Equation 2. $P_2$ in per unit power is then calculated from the power flow sensed by 237 prior to the fault divided by $P_m$. From this per unit power $P_2$, the appropriate curve in FIG. 13 is selected and from the abscissa value W, a point on this curve is read off. This curve can be a table of numbers stored in the computer memory. The point which is read off yields a value for the change in excitation $\Delta e$. This change in excitation is immediately applied to the field 253 as an increase in the field current through field 253. If the synchronous condenser 236 is operating with high excitation, then an additional correction factor for the saturation of the iron should be included. The value of field current selected for field 253 should be that value which produces a characteristic curve 261 in FIG. 12 which fulfills the unique condition that the area below line 264 and above curve 267 between points 266 and 268 is equal to the area above line 264 and below curves 269 and 272 between points 268 and 273 plus the losses during the transient. Or stated another way, the value of increased excitation produced by field 253 and selected by the computer should be such that the transient using this increased excitation, will cause the rotor of generator 21 and the rotor of synchronous condenser 236 to each approach its final steady value of angle and of speed tangentially and with no overshoot.

There is a simplified mode of operation of the system in FIG. 11. This produces only an approximation to the optimum deadbeat transient control, but it is engineeringly satisfactory. This mode of operation is designed to do its best job for the worst possible case. The worst possible case is near $P_2=1$. Systems can be designed to operate during the interval following a fault with $P_2=.9$ or .8. A straight line can be drawn in FIG. 13 which approximates the curve $P_2=0.9$ and terminates at approximately $W=1$ and $\Delta e=.55$. If this straight line is used for control, instead of the family of curves which would produce optimal deadbeat transients, then there will be a small amount of overshoot for large serious transients. But this amount is engineeringly acceptable. For very small transients, the per unit overshoot would be larger but the actual angular overshoot would be less and would also be engineeringly acceptable.

In the three embodiments shown in FIGS. 1, 7 and 11, the phase angle sensor was connected to a sending end bus and a receiving end bus. The explanation of the operation referred to the reactance of the transmission lines only and did not consider the reactance of the generator or of the load. The power angle curves shown in FIGS. 2, 8 and 12 were all drawn with reference to the phase angle shift on the transmission line. Because the transmission lines are linear, most of these power angle curves are essentially sinusoidal in shape following Equation 1. It would have been possible to have sensed or calculated the voltage behind the generator reactance and the voltage behind the load reactance and used the phase angle shift between this internal voltage in the generator and internal voltage in the load as an abscissa for a power angle curve. In this case, saliency of the poles of the generator or the load would distort the power angle curves from a sinusoidal shape to one which has a large second harmonic.

Although using the phase of the voltage behind the reactance of the generator and the phase of the voltage behind the reactance of the load is a more fundamental method of analysis of each of these systems and includes more information, this has three disadvantages. First, the voltages are not directly measurable in an easy manner by the phase angle sensors 46, 47, 163, 162 and 239. Secondly, the shape of the power angle curve is non-sinusoidal and will make more difficult the computation of Equations 5, 10, 14 and 15. Thirdly, the voltage behind the reactance in a synchronous machine is a non-linear function of the excitation and of the reactive KVA.

The computations for the control in FIG. 1, which are based upon the phase angle of the voltage on bus 27 and the phase angle of the voltage on bus 29, are independent of the reactance of the system that is not included between these two buses except for a few minor variations. In FIG. 1, the reactance of generator 21 and of the phase shifting transformer 23 could possibly be a significant proportion of the reactance of the entire system and the phase shift from the excitation voltage within generator 21 and bus 27 might be significant. Also, in FIG. 1, the reactance between bus 29 and the apparent internal voltage of load 28 would include the reactance of synchronous condensers and synchronous motors contained within the load and this reactance might also be pertinent to the computation of the transient. One effect of the reactances of the generator and of the load is to reduce the power flow at the limit of stability. With reference to FIG. 4, the limit of stability for the characteristic curve 66 is shown as $\theta_x$ which is calculated in Equation 12b. Considering the extra reactance attributed by the generator, there exists an overall system characteristic curve which lies under curve 66 and which has as system maximum phase shift at the limit of stability which is less than $\theta_x$ as shown in FIG. 4.

The limit of stability can be calculated as follows:

$$P_m' = \frac{E'V'}{X_y'} \tag{19}$$

$X_r'$ is the reactance of the entire system in FIG. 1 including the reactance of generator 21, the parallel reactance remaining transmission lines 31–33 and the reactance of load 28. $E'$ is the voltage behind the reactance of generator 21. $V'$ is the voltage behind the reactance of load 28. $P_m'$ is the maximum power than can be delivered from generator to load with a 90° phase angle between $E'$ and $V'$.

For non-salient pole synchronous machines, where the generator shaft power is $P_s$, the angle at the limit of stability for a transient swing is $$\theta_x' = \frac{\pi}{2} + \cos^{-1} \frac{P_s}{P_m'} \tag{20}$$

$\theta_x'$ is the maximum permissible transient angular difference between voltage $E'$ and voltage $V'$, for stability. This equation is based upon the assumption of system linearity and the sinusoidally shaped power angle curve. In actual systems with non-linear elements and salient pole devices, Equation 20 would have to be replaced by a graphical construction to determine the maximum stability angle.

The state represented by point 108 in FIG. 4 is the maximum stability angle for characteristic curve 91. This is equal to $\theta_x - \alpha$. Considering the generator reactance, the state represented by point 108 should be replaced by a state at the angle $\theta_x' - \alpha$. These modifications will influence command 43, the calculation of Equation 18 and command 52.

In addition, it should be recognized that the controls shown in FIG. 1, applied to a generator 21 with significant reactance, results in the area 1 shown in FIG. 2 being a function of the energy stored in the sum of the mechanical energy of the inertia of generator 21 and the magnetic energy of the reactance of 21. In a similar manner, the energy represented by area 2 in FIG. 2 is the sum of the energy change in the inertia of generator 21 and in the reactance of generator 21. These comments with regard to generator reactance apply equally well to generator 21 in FIG. 7 and to generator 21 in FIG. 11.

It is within the scope of this invention to provide within the system state computer 169 in FIG. 7 an additional computation which starts with the information provided on channel 168 concerning the phase of the bus 27 and calculates the additional phase shift within generator 21 due to the alternating current provided by generator 21 and calculates the voltage behind this reactance in generator 21 using field current information, saturation curve information and the vector diagram of the generator voltages and currents, and obtains a calculated voltage with a calculated phase angle at a point in the system other than the point at which the phase angle sensor 163 is connected, and utilizes this calculated voltage and the reactance between this calculated voltage and bus 27 to alter curve 181 and curve 182 in FIG. 8 to conform to the larger system including the reactance of the generator 21. In a similar manner, the system state computer 169 can include the load reactance for load 28, a calculation of the magnitude and phase of the voltage behind the load reactance of load 28 and use this information instead of the voltage and phase on bus 29 to alter curves 181 and 182 in FIGS. 8 to conform to the larger system which includes the reactance of the load 28.

It is within the scope of this invention to provide the power flow sensor at other positions in the system of FIG. 7. For example, power flow information from each individual line 31 or 32 or 33 may be provided to the system state computer 169. In addition, the turbine setting for the generator 21 which is a measure of the thermodynamic power being supplied to the turbine may be provided for system state computer 169. In addition, the electrical power flow from generator 21 to bus 27 can be measured and provided to system state computer 169. These power flow sensors can be used instead of sensor 161 in FIG. 7 for a control of the mode shown in FIG. 8.

It is within the scope of this invention to provide additional state variable information, such as the stroboscopic angle of the generator 21, and time derivative of this angle and of the voltage phase angles and of the power flow to obtain a systems state vector of higher order and greater complexity than the simplified vector described herein.

It is within the scope of this invention to provide a complex set of decision functions, either sequentially in time or as a state logic decision control table, to provide a control which is responsive to this expanded state vector.

It is within the scope of this invention to provide a combination of two or more of the modes of control shown in FIGS. 1, 7 and 11. In particular, both the series capacitors 151–153 shown in FIG. 7 and the field control on synchronous condenser 236 in FIG. 11 can be provided in the same system, and the same system state computer and excitation control 242 can deliver two sets of commands, one set to the field 253 and the other set to the circuit breakers 156–158 to provide both the insertion of the capacitors and their removal during the transient, and the increase in excitation of the synchronous condenser and its return to normal excitation during the transient.

Figure 14:
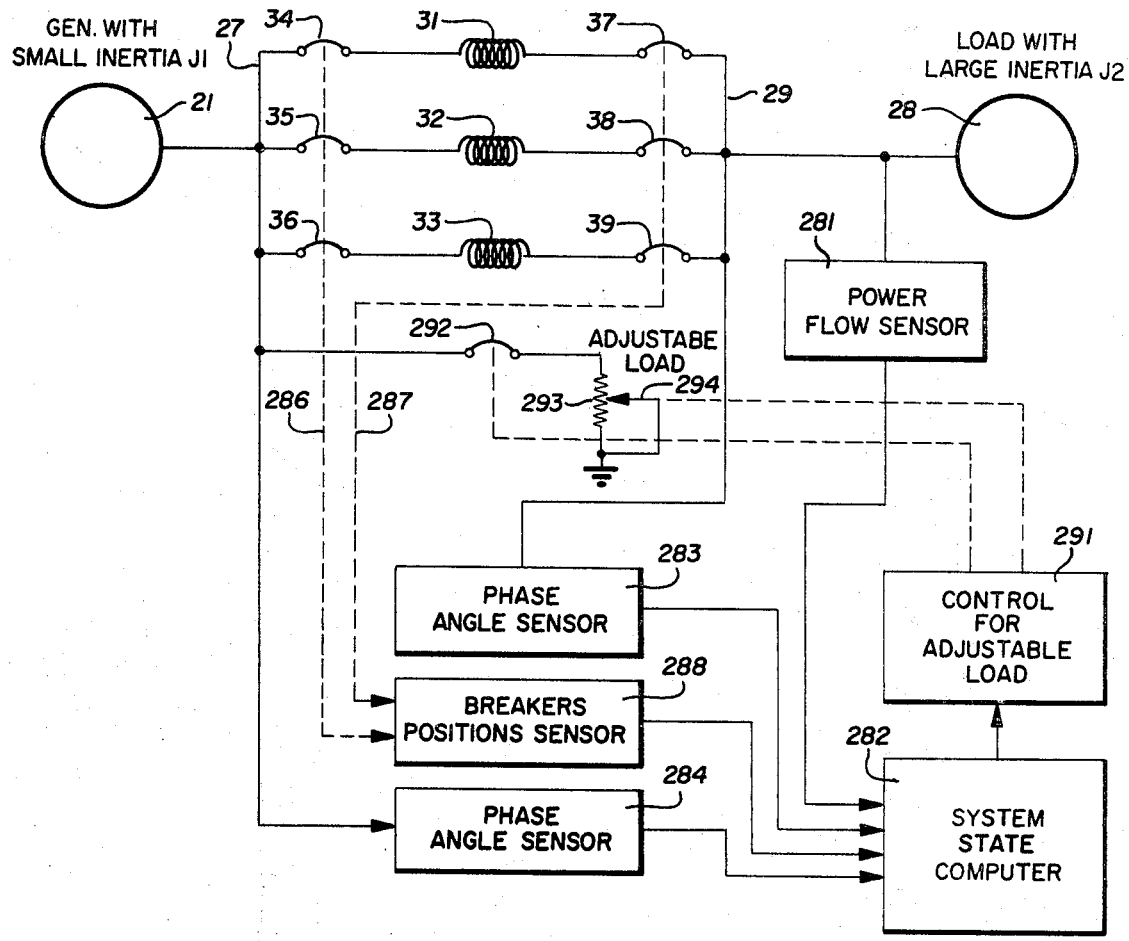
FIG. 14 is a block diagram of still another embodiment of the present invention in which an adjustable load absorbing power is provided.

In FIG. 14, there is shown a block diagram of still another embodiment of a power system incorporating the present invention in which the transients in the power system are controlled by use of an adjustable power absorbing load. In many respects, it is similar to the embodiment shown in FIG. 7. It is comprised of a generator 21 with small inertia J1 which serves as the source of power. A load 28 is provided which has a large inertia J2 and which serves as a load for absorbing power. The generator 21 is connected to the three-phase bus 27 and the load 28 is connected to the three-phase bus 29. Transmission lines 31, 32 and 33 are provided which are connected to the three-phase bus 27 through circuit breakers 34, 35 and 36 and to the three-phase bus 29 through circuit breakers 37, 38 and 39. The bus 29 is connected to a power flow sensor 281, the output of which is connected to a system state computer 282. The three-phase bus 29 is also connected to a phase angle sensor 283, the output of which is also connected to the system state computer 282. The three-phase bus 27 is connected to a phase angle sensor 284 which has its output also connected to the system state computer 282. The open or closed states or positions of the breakers 34–39 are supplied by communication channels 286 and 287 to a breaker position sensor 288, the output of which is also supplied to the system state computer 282. A system state vector whose components are all of the present measurements and measurements prior to a fault in the power system is delivered by the computer 282 to the control 291 for adjustable load. The control for adjustable load 291 is provided with means for operating a circuit breaker 292 to connect a load 293 to the distributing bus 27. It is also provided with means for controlling or adjusting the load 293 which is shown as means for adjusting a tap 294 on the resistive load 293.

The mode of operation of the control in FIG. 14 is very similar to that in FIG. 7 with the exception that the control 291 controls the adjustable load 293 rather than capacitors in series with the transmission line as shown in FIG. 7.

The mode of operation of the embodiment shown in FIG. 14 is shown in the graphs in FIGS. 15 and 16. When the adjustable load 293 is applied by the control 291 through the information supplied from the computer 282 at the commencement of a transient in the power system at angle $\alpha_1$ and removed at angle $\alpha_2$, then the generator inertia J1 loss of energy is represented by the square root of area $E_3$ as shown in FIG. 15 minus the square root of area $E_1$ shown in FIG. 15. The load inertia J2 loss of energy is proportional to the square root of area $E_2$ shown in FIG. 16. Thus, for both the generator 21 and the load 28 to have the same speed and frequency at the end of the transient the ratio of generator inertia loss of energy to load inertia loss of energy should equal the ratio of generator inertia to load inertia.

$$\frac{\sqrt{E_3}-\sqrt{E_1}}{\sqrt{J1}}=\frac{\sqrt{E_2}}{\sqrt{J2}} \quad (21)$$

Therefore, $$P_A=\frac{E_2}{\alpha_2-\alpha_1}\left(1-3\frac{J1}{J2}\right)\frac{J1}{J2}\ll1$$

where $P_A$=the power absorbed by the adjustable load 293.

When the inertia of J2 is less than the inertia of J1, it is preferable to connect the adjustable load 293 to the three-phase receiving bus 29 rather than to the three-phase distributing bus 27 as shown in FIG. 14.

From the foregoing embodiments of the present invention, it can be seen that the alternating current power transmission systems are of a type which have an energy storage component which normally has a predetermined value of energy stored therein. Means is provided for sensing a vector of the system which changes with a change in the state of the system exclusive of the alternating current voltage magnitude of the system. Computer means is provided for computing a signal responsive to changes in the stored energy in the energy storage component from a predetermined value utilizing this vector. Adjusting means is provided for changing the power flow into and out of the energy storage component. Means is provided for computing the voltage phase difference between two spaced locations in the system. Control means is also provided which is responsive to the vector for controlling the adjusting means to cause the phase difference to approximate a predetermined value when the energy in the energy storage component approximates a predetermined value. The adjusting means includes means for causing the power flow at one of said spaced locations to exceed a predetermined value for a portion of the interval of time when said energy exceeds the predetermined value and approximates the predetermined value when the energy approximates the predetermined value.

It can be seen that the control means which is provided in the various embodiments is responsive to different parameters. Thus, there have been disclosed embodiments in which the control means is responsive to a voltage phase difference, to the energy stored in the energy storage component, to both a voltage phase difference and to power flow, and to an integral of the power flow with respect to the voltage phase difference.

In certain of the embodiments, a power absorbing load is connected to the system and the adjusting means adjusts the power absorbing load. In other embodiments, the system includes a series impedance and the adjusting means adjusts the series impedance. In still other embodiments, the system includes at least one switch and the adjusting means includes means for controlling the open and closed states of the switch. In others, the system is provided with a synchronous machine having an excitation control. The adjusting means includes means for adjusting the quantity of excitation to the excitation control. The control means includes means for causing the phase difference to change monotonically with respect to a predetermined value.

Stated in another manner, in the alternating current system disclosed herein the state variable is responsive to differences in voltage phase angle between two spaced locations in the system. Sensing means is provided for sensing the state variable and computer means responsive to the transient change in the state variable generates an initial command at the initiation of a transient change and generates a final command when the state variables approaches a predetermined value. Control means is connected to the computer means and is responsive to the initial and final commands and controls a characteristic of the circuit which is utilized for connecting the source of power to the load absorbing power. The control means includes means for increasing the power transmitting capability of the circuit in response to the initial command during a portion of the transient change and thereafter decreases the power transmitting capability of the circuit in response to the final command.

Stated still another way, the power system herein disclosed utilizes sensing means for determining the state of the system. The control means which is responsive to the sensing means adjusts the power flow through circuit breaker provided in the transmission line connecting the source of power to the load to cause the inertia of a synchronous machine having a rotating inertia to change from a first synchronous phase to a second synchronous phase monotonically, and thereafter to cause the power flow to change rapidly to a predetermined value.

The control means can also be used to cause the power flow to increase monotonically from less than a predetermined value to more than a predetermined value and then to decrease rapidly to a predetermined value when the frequency of the power in the transmission line equals a predetermined value.

It is apparent from the foregoing that there has been provided a power system having transient control and a method for transient control which will prevent the oscillation of rotors of synchronous generators from becoming cumulative and which will prevent synchronous generators from falling out of synchronism. With the present system and method, the phase angle of the synchronous generator when it changes from an initial value to a final desired value approaches the final value tangentially and does not overshoot. The phase angle difference between the sending and receiving end of a long transmission line is controlled so that when the phase angle changes it approaches its final steady state value tangentially and also does not overshoot.

I claim:

1. In an alternating current power transmission system of the type having an energy storage component normally having a predetermined value of energy stored therein, means for sensing a state vector of the system state with a plurality of state variable elements which changes with the change in the state of the system exclusive of the alternating current voltage magnitude of the system, means for computing an electrical signal responsive to changes in the stored energy in said energy storage component from said predetermined value utilizing said vector, adjusting means for changing the electrical power flow into and out of said energy storage component, means responsive to the voltage phase difference between two spaced locations in said system to generate one component of said vector, and control means responsive to said vector for controlling said adjusting means to cause said phase difference to approximate a predetermined value of phase difference when the energy in said energy storage component approximates said predetermined value of energy.

2. A system in claim 1 wherein said control means includes means for causing the electrical power flow at one of said spaced locations to exceed a predetermined value of power for a portion of the interval of time when said energy exceeds said predetermined value of energy and said phase difference is less than said predetermined value of phase difference and to approximate said predetermined value of power when said energy approximates said predetermined value of energy.

3. A system as in claim 1 wherein said control means is responsive to the rate of change of said voltage phase difference.

4. A system as in claim 1 wherein said control means is responsive to the energy stored in said energy storage component.

5. A system as in claim 2 wherein said control means is responsive both to said voltage phase difference and to said power flow.

6. A system as in claim 2 wherein said control means is responsive to the integral of said power flow with respect to said voltage phase difference.

7. A system as in claim 1 together with a power absorbing load connected to the system and wherein said adjusting means is connected to the power absorbing load and adjusts the power absorbing load.

8. A system as in claim 1 wherein said system includes a series impedance and wherein said adjusting means adjusts said series impedance.

9. A system as in claim 1 wherein said system includes at least one switch and wherein said adjusting means includes means for controlling the open and closed states of said switch.

10. A system as in claim 1 wherein said system includes a synchronous machine having excitation control and wherein said adjusting means includes means for adjusting the quantity of excitation to the excitation control.

11. A system as in claim 2 wherein said control means is responsive to means for causing said phase difference to change monotonically in accordance with said preselected value.

12. A system as in claim 10 wherein said control means is responsive to changes in value of said stored energy.

13. In an alternating current system, a source of power, a load for absorbing power, an energy storage element, an alternating current transmission circuit connecting said source of power to said load and to said energy storage element and being capable of transmitting electrical power into and out of said energy storage element, said system having a state variable component of the system state vector responsive to differences in voltage phase angle between two spaced locations in said system, sensing means for sensing said state variable, computer means responsive to a transient change in said state variable for generating an initial command and generating a final command when said state variable approaches a predetermined value, and control means connected to said computer means and responsive to said initial and final commands for controlling a characteristic of said circuit.

14. A system as in claim 13 wherein said control means includes means for increasing the power transmitting capability of said circuit in response to said initial command during a portion of said transient change and to decrease the power transmitting capability of said circuit in response to the final command.

15. A system as in claim 13 wherein said transmission circuit has a series impedance and wherein said control means includes means for controlling the series impedance of the circuit, whereby the series impedance is reduced responsive to the said initial command.

16. A system as in claim 13 wherein said circuit includes a switch movable between open and closed positions and wherein said control means includes means for controlling said switch.

17. A system as in claim 13 wherein said control means includes means for controlling the relationship between said state variable and the power transmitted by said circuit.

18. A system as in claim 13 together with a synchronous rotating machine having an excitation control and wherein said control means includes means for changing the quantity of excitation to said excitation control, whereby responsive to said initial command the said excitation is increased in a predetermined manner.

19. A system as in claim 13 together with means for computing a signal representative of the energy stored in said energy storage element, and wherein said control means includes electrical means for causing said state variable to change monotonically and to equal a predetermined value substantially at the same time as the energy stored in the energy storage element equals a predetermined value.

20. A system as in claim 13 wherein said power absorbing load is adjustable and wherein said control means includes means for adjusting the power absorbing load.

21. A system as in claim 13 having a second state variable component of the state vector responsive to the signal output of means for sensing the difference between the frequency of said voltage at one of said locations and a predetermined frequency, together with means for determining the electrical power flow on said circuit and wherein said control means includes means for causing said power flow to approximate a predetermined value when the state variable approximates a predetermined value and said second state variable is substantially zero.

22. A system as in claim 21 wherein said control means is responsive to the integral of said power flow with respect to said state variable.

23. A system as in claim 13 wherein said circuit includes a series capacitor and wherein said control means includes means for inserting or removing said series capacitor in said circuit.

24. In an alternating current transmission system of the type having power flow on at least one transmission line from a first location to a second location, means for measuring said power flow, computer means to determine the voltage phase angle difference between said first location and said second location, means to integrate said power flow with respect to said angle to provide an integral, adjusting means to adjust the relationship between said angle and said power flow, and control means responsive to said integral for controlling said adjusting means so that when said angle approximates a predetermined value, said integral approximates a predetermined angle.

25. A system as in claim 24 wherein said adjusting means includes a capacitor and wherein said control means includes means for inserting said capacitor in series with said transmission line.

26. A system as in claim 24 wherein said adjusting means comprises a phase shifting transformer and wherein said control means includes means for inserting said phase shifting transformer in series with said transmission line.

27. A system as in claim 24 wherein said adjusting means comprises a circuit breaker having open and closed states and wherein said control means includes means for shifting said circuit breaker into said states.

28. A system as in claim 24 together with a synchronous machine having an excitation control capable of varying the voltage at one of said locations, and wherein said adjusting means comprises means for adjusting said excitation control.

29. A system as in claim 24 wherein said computer means includes a pre-stored value of reactance and wherein said computer means is responsive to said measured power flow.

30. A system as in claim 24 wherein said computer means includes means for determining the voltage phase angle at one of said locations.

31. A system as in claim 24 together with a power absorbing load at one of said locations and wherein said adjusting means includes means for adjusting the power absorbing load.

32. In a power system, a source of power, a load for absorbing power, a synchronous machine having rotating inertia and an excitation control, a transmission line circuit connecting to said load, circuit breaker means connecting said transmission line to said synchronous machne, means to deliver power from said source to said machine, sensing means for determining the state of the system by sensing the magnitude of the current in said transmission line that is responsive to the synchronous phase of said inertia, means for adjusting the electrical power flow, and control means responsive to said sensing means for adjusting the electrical power flow through the circuit breaker to cause the power flow to increase when the rate of change of said phase is significantly non-zero and to cause the inertia to change from a first synchronous phase to a second synchronous phase and thereafter to cause said power flow to change rapidly to a predetermined value, while said inertia rotates at substantially said second synchronous phase.

33. A system as in claim 32 wherein said control means includes means for causing said circuit breaker to open and to thereafter re-close when the inertia has the second synchronous phase.

34. A system as in claim 32 together with a phase shifting transformer connected to said circuit breaker and wherein said control means includes means for causing said circuit breaker to introduce phase shift from the phase shifting transformer into the transmission line circuit and to remove said phase shift from the transmission line circuit when said inertia has the second synchronous phase.

35. A system as in claim 32 wherein said control means includes means for adjusting excitation control of the synchronous machine.

36. A system as in claim 32 together with a second circuit breaker and a capacitor, and wherein said control means includes means for causing said second circuit breaker to change state and thereby cause current to flow from said transmission line circuit through said capacitor and then causes said second breaker to change state again when said inertia has the second synchronous phase.

37. A system as in claim 32 wherein said excitation control is responsive to a voltage component of the state vector during the steady state and is responsive to a power flow component of the state vector during said change.

38. A system as in claim 32 wherein said control means is responsive to an intergral of the power flow through said circuit breaker with respect to the synchronous phase of the inertia.

39. A system as in claim 32 together with computer means responsive to said sensed state to calculate the stored energy in said inertia and wherein said control means is responsive to the stored energy.

40. In a power system, a source of power, a load for absorbing power, a transmission line connecting said source of power to said load, a circuit breaker movable between open and closed positions connected in series with said transmission line, means for sensing the frequency of the voltage in said transmission line, and control means responsive to the sensed frequency for altering the power flow through said transmission line whereby the power flow is caused to increase from less than a predetermined value to more than a predetermined value when the sensed frequency deviates from a first predetermined value, and then decreased rapidly to said predetermined value when the sensed frequency passes a second predetermined value.

41. A system as in claim 40 wherein said control means includes means for opening and closing said breaker.

42. A system as in claim 40 together with a capacitor connected in parallel with said breaker.

43. A system as in claim 40 together with a phase shift transformer connected to said breaker.

44. A system as in claim 40 together with a synchronous machine having an excitation control and a power winding and means connecting said power winding to said breaker.

45. A sytem as in claim 44 wherein said control means is connected to said excitation winding and controls the excitation to said excitation winding.

46. A system as in claim 40 wherein said control means is connected to adjust the power absorbing load.

47. A system as in claim 40 including means to determine the voltage phase at one end of said transmission line, means to integrate said power flow with respect to said phase to provide an integral, and wherein said control is responsive to said integral.

48. In a system of the character described having a normal system state, said system state represented by a multicomponent vector including voltage frequency and phase, a reactive component having power flow therethrough, shifting means for introducing a voltage phase shift in series with said reactive component, first sensing means responsive to the initiation of a transient in the system state, second sensing means responsive to the deviation of the system state from a desired final steady state, and a two-state relay means responsive to the first sensing means to activate the shifting means and responsive to the second sensing means to deactivate the shifting means to remove said phase shift when said deviation is minimum.

49. A system as in claim 48 wherein said second sensing means includes means which is responsive to the system stored energies.

50. A system as in claim 48 wherein said second sensing means includes means which is responsive to the instantaneous frequency at one point in said system.

51. A system as in claim 48 wherein said second sensing means includes means which is responsive to the power flow through said reactive component.

52. A system as in claim 48 wherein said second sensing means includes means which is responsive to the voltage phase shift through said reactive component.

53. A system as in claim 48 wherein said shifting means is a phase-shift transformer.

54. A system as in claim 48 wherein said shifting means is a series capacitor.

55. A system as in claim 48 together with a synchronous machine having an excitation winding and a power winding, and wherein said shifting means includes means for supplying power to the excitation winding and means connecting said power winding to said reactive component.

56. A system as in claim 48 wherein said shifting means is a controllable load absorbing power together with means connecting said load to said component.

57. In a system of the character described, said system having a transmission line, a predetermined state and a system state, said system state being a plurality of state variables including the instantaneous frequency and excluding the magnitude of the voltage on said transmission line, a source of power connected to said transmission line, a receiver of power connected to said transmission line, a switch in series with said transmisson line and joining said source of power and said receiver of power, means for producing a voltage phase angle across said switch when it is open, means for sensing the system state, means for opening said switch responsive to the initiation of a transient in said system state, and means for closing said switch when the frequency component of said system state is changing and approximates a predetermined frequency.

58. A system as in claim 57 wherein said means for sensing the state includes means for sensing the power flow through said line.

59. A system as in claim 57 wherein said means for sensing the state includes means for sensing the voltage phase angle difference between two points on said line.

60. A system as in claim 57 wherein said means for producing a voltage phase angle is a phase-shift transformer.

61. A system as in claim 57 wherein said means for producing a voltage phase angle is a series capacitor.

62. A system as in claim 57 wherein said means for producing a voltage phase angle is a synchronous machine.

63. A system as in claim 57 wherein said means for producing a voltage phase angle is a network of impedances.

64. In a system having a normal system state, an alternating current transmission line having power flow therethrough, a switch in series with said line, an intermittent duty capacitor in parallel with said switch, means for determining a vector of one or more state variable components indicative of transient changes in the system state, means to open said switch as a first response to said vector, and mean to close said switch as a second response to said vector.

65. A system as in claim 64 wherein said first response is responsive to a first component of said vector, and wherein said second response is responsive to a second component of said vector.

66. A system as in claim 64 wherein said first response is responsive to a positive time rate of increase of a power flow component of said vector, and wherein said second response is responsive to the time rate of change of voltage phase angle across said line.

67. A system as in claim 64 together with a second alternating current transmission line and a second switch in series with said second transmission line, said second switch having open and closed states, and wherein said means to open said switch is responsive to the state of said second switch.

68. A system as in claim 64 wherein said first response is responsive to the power flow through said switch, and wherein said second response is responsive to the power flow through said capacitor and wherein "responsive to" includes "responsive to time derivatives of."

69. A system as in claim 64 wherein said first response is responsive to the integral of power flow with respect to voltage phase angle and wherein said second response is responsive to the time derivative of voltage phase angle across said line.

70. A system as in claim 64 together with an energy storage element at one end of said line and wherein said vector includes a determination of the energy stored in said element.

71. In a sytem of the character described having a normal steady system state, a phase-shift transformer having different phases, a transmission line, and switch means connecting said line to one of said different phases, first sensing means responsive to the initiation of a transient in the state of the system, second sensing means responsive to the deviation of the system state from the normal steady state, and control means responsive to the first sensing means to operate said switching means to connect said line to one of said phases, and also responsive to the second sensing means to connect said line to another of said phases.

72. A system as in claim 71 wherein one of said sensing means includes means for sensing the power flow through said line.

73. A system as in claim 71 wherein one of said sensing means includes means for sensing the frequency at one point in said system.

74. A combination as in claim 71 wherein one of said sensing means includes means for sensing stored energies.

75. In an alternating current power transmission system characterized by a nonlinear relationship of normal value between the power flow and the voltage phase angle difference between the source and load, means for detecting the onset of a transient due to phase angle change, means for determining the steady state phase angle corresponding to said normal value, means for altering said nonlinear relationship so that the phase angle transient will have an extremum with zero time derivative at approximately the steady-state phase angle, and means for restoring said nonlinear relationship to its normal value when the angle transient reaches its extremum.

76. A system as in claim 75 wherein said altering means includes a series capacitor.

77. A system as in claim 75 wherein said altering means includes a parallel impedance.

78. A system as in claim 75 wherein said altering means includes an adjustable power absorbing load.

79. A system as in claim 75 wherein said altering means includes a phase-shift transformer.

80. A system as in claim 75 together with a synchronous machine having a power winding connected into the system and an excitation winding, and control means for exciting said control winding, said control means being responsive to said altering means.

81. A system as in claim 75 together with a transmission line connected between said source and said load, and a switch and a reactance connected in parallel and connected in series with said transmission line, said switch having open and closed positions.

82. A system as in claim 81 wherein said altering means control the state of said switch.

83. A system as in claim 81 wherein said altering means controls the magnitude of said reactance.

84. A system as in claim 81 wherein said reactance is capacitive.

85. In a method for controlling an alternating current power system of the type having an energy storage component normally having a predetermined value of energy stored therein, sensing a multi-component vector of the system state variables which changes with the change in the state of the system exclusive of the alternating current voltage magnitude of the system, computing a signal responsive to changes in the stored energy in said energy storage component from said predetermined value utilizing said vector, computing the voltage phase difference between two spaced locations in the system and placing a temporary alternation on said power system responsive to said signal and said difference to cause said phase difference to subsequently approximate a predetermined value when the energy in the energy storage component approximates a predetermined value and thereupon removing the temporary alteration to diminish the rate of change of said energy.

86. In a method for controlling an alternating current system of the type which includes a source of power, a load absorbing power, an energy storage element and an alternating current transmission system connecting the source to the load and to the energy storage element and which has a state variable responsive to differences in voltage phase angle between two spaced locations in the system, sensing said state variable, generating an initial command in response to a transient change in said state variable and generating a final command when the state variable approaches a predetermined value, and controlling a characteristic of the transmission line circuit utilizing said initial and final commands.

87. In a method for controllng an alternating current system of the type having power flow on at least one transmission line from a first location to a second location, sensing the power flow in the transmission line, determining the voltage phase angle difference between the first location and the second location, integrating the power flow with respect to the angle to provide an integral, and adjusting the relationship between said angle and said power flow so that when the angle approximates a predetermined value the integral approximates a predetermined value.

88. In a power system comprising an alternator with rotating shaft having inertia whose differential stored energy is zero at a predetermined speed, a load with alternating voltage, and a transmission system connecting said alternator to said load, said power system having a nonlinear relationship between power transmitted and the phase angle between the said rotating shaft and the said alternating voltage, control means for changing said nonlinear relationship from one operating mode to only one other different operating mode, one mode designated the transient mode and the other mode designated the steadystate mode, means for detecting the initiation of a transient in said power system exclusive of a voltage magnitude transient, means responsive to said initiation to actuate said control means to produce a first change in said relationship to said transient mode, means responsive to said differential stored energy to deliver a sensed signal, and means responsive to said sensed signal to actuate said control means a second time to produce a second change in said relationship to said steadystate mode when said differential stored energy is substantially zero.

89. A sytem as in claim 88 wherein said transmission system includes a capacitor in series with a transmission line and a switch in parallel with the capacitor and wherein said control means opens said switch to produce said transient mode and closes said switch to produce said steadystate mode.

90. A system as in claim 88 including a predetermined maximum current, a predetermined maximum time rate of change of current, wherein said alternator has a field winding carrying current supplied by an exciter, and wherein said transient mode produced by said control means causes firstly the time derivative of said current to approach said predetermined maximum time rate of change of current and causes secondly the said current to approach said predetermined maximum current.

91. A system comprising an alternator with rotating shaft having inertia whose differential stored energy is zero at a predetermined speed, a load with alternating voltage, and a transmission system connecting said alternator to said load, said system having a nonlinear relationship between power transmitted and the phase angle between the said rotating shaft and the said alternating voltage, control means for changing said non-linear relationship from one operating mode to at least one other different operating mode, the final operating mode being designated the steadystate mode, and another operating mode being designated a transient mode, means for detecting the initiation of a transient in said phase angle, means responsive to said initiation to actuate said control means to produce a first change n said relationship, means responsive to said differential stored energy to deliver a first signal, means responsive to the differential stored energy change that can occur during said transient mode to deliver a second signal, means responsive to the difference between said first signal and said second signal to actuate said control means to change said relationship to said transient mode, and means responsive to said first signal to actuate said control means to change said relationship to said steadystate mode when said differential stored energy is substantially zero.

92. A system as in claim 91 wherein said transmission system has a switch which can insert a series capacitor in series with a transmission line and wherein said control means controls the insertion and removal of said capacitor, said first signal is responsive to the frequency of alternations at said alternator, and said second signal is responsive to said phase angle.

93. A system as in claim 91 wherein said alternator has a field winding and wherein said control means changes the field current in said field winding, said first signal is responsive to the speed of said shaft, and said second signal is responsive to said phase angle.

94. In a power system connected to a synchronous machine with a field excitation winding, an excitation regulator capable of delivering a predetermined ceiling voltage to said field winding when operating in a first mode, and capable of generating a continuously adjustable value of the field current in said field winding when operating in a second mode, angle signal means to generate an angle signal responsive to the phase angle of the rotor of the synchronous machine, detecting means for the detection of the initiation of a transient change in said phase angle and its time derivatives, computational means responsive to said angle signal and said detection to compute a desired target value for said angle signal, and control means responsive both to the difference between said target value and said angle signal and to the time derivatives of said difference for controlling the current in said field winding to cause it to first approach an extreme value responding to said ceiling voltage, when the regulator is operating in said first mode, and lastly said control means also responsive to the expected changes during said second mode controls said regulator to operate in said second mode to cause the angle signal to approach said target value simultaneously as the time derivative of said angle signal approaches zero, and thereafter to keep said time derivative substantially zero.

References Cited

UNITED STATES PATENTS 1,935,292  11/1933  Griscom et al. _____ 290—40

ROBERT K. SCHAEFER, Primary Examiner

H. J. HOHAUSER, Assistant Examiner